(12) United States Patent
Weber et al.

(10) Patent No.: US 12,120,147 B2
(45) Date of Patent: Oct. 15, 2024

(54) SYSTEMS AND METHODS FOR INTELLIGENT IDENTIFICATION AND AUTOMATED DISPOSAL OF NON-MALICIOUS ELECTRONIC COMMUNICATIONS

(71) Applicant: Expel, Inc., Herndon, VA (US)

(72) Inventors: Elisabeth Weber, Herndon, VA (US); Jane Hung, Raleigh, NC (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/607,463

(22) Filed: Mar. 16, 2024

(65) Prior Publication Data

US 2024/0223607 A1   Jul. 4, 2024

Related U.S. Application Data

(63) Continuation-in-part of application No. 17/970,069, filed on Oct. 20, 2022, which is a continuation of application No. 17/696,151, filed on Mar. 16, 2022, now Pat. No. 11,509,689, which is a continuation of
(Continued)

(51) Int. Cl.
*H04L 9/40* (2022.01)
*G06N 20/00* (2019.01)

(52) U.S. Cl.
CPC ......... *H04L 63/1483* (2013.01); *G06N 20/00* (2019.01); *H04L 63/1425* (2013.01); *H04L 63/1433* (2013.01)

(58) Field of Classification Search
None
See application file for complete search history.

(56) References Cited

U.S. PATENT DOCUMENTS 10,601,865 B1 * 3/2020 Mesdaq ............. H04L 63/1425
11,595,437 B1 * 2/2023 Mushtaq ............ H04L 63/1483
(Continued)

*Primary Examiner* — Khang Do
(74) *Attorney, Agent, or Firm* — Padowithz Alce; Alce PLLC; Chandler Scheitlin

(57) ABSTRACT

A system and method for accelerating a disposition of non-malicious electronic communications includes extracting one or more corpora of feature vectors from an electronic communication based on providing the electronic communication as input to a feature extractor; computing, by a machine learning-based electronic communication classification model, an electronic communication-type classification inference that includes a probability of the electronic communication being of the target non-malicious electronic communication type in response to the machine learning-based electronic communication classification model receiving the one or more corpora of feature vectors; attributing a classification label of the target non-malicious electronic communication type to the electronic communication based on the probability of the electronic communication-type classification inference satisfying a minimum electronic communication classification threshold; and automatically routing a security alert associated with the electronic communication to an alert disposal queue based on the electronic communication having the classification label of the target non-malicious electronic communication type.

18 Claims, 13 Drawing Sheets

Related U.S. Application Data application No. 17/501,708, filed on Oct. 14, 2021, now Pat. No. 11,310,270.

(60) Provisional application No. 63/463,195, filed on May 1, 2023, provisional application No. 63/454,078, filed on Mar. 23, 2023, provisional application No. 63/129,836, filed on Dec. 23, 2020, provisional application No. 63/092,307, filed on Oct. 15, 2020, provisional application No. 63/091,409, filed on Oct. 14, 2020.

(56) References Cited

U.S. PATENT DOCUMENTS

| | | | | |
|---|---|---|---|---|
| 2010/0145900 A1* | 6/2010 | Zheng | H04L 51/212 | 709/206 |
| 2010/0162396 A1* | 6/2010 | Liu | G06F 21/566 | 709/206 |
| 2013/0246017 A1* | 9/2013 | Heckerman | G06F 18/24155 | 703/2 |
| 2013/0247192 A1* | 9/2013 | Krasser | H04L 63/1425 | 726/23 |
| 2016/0142429 A1* | 5/2016 | Renteria | H04L 63/1416 | 726/23 |
| 2017/0359362 A1* | 12/2017 | Kashi | H04L 51/212 | |
| 2018/0082062 A1* | 3/2018 | Hager | H04L 63/164 | |
| 2018/0278627 A1* | 9/2018 | Goutal | H04L 63/1416 | |
| 2018/0295153 A1* | 10/2018 | Eisen | H04L 63/1433 | |
| 2019/0052655 A1* | 2/2019 | Benishti | G06Q 10/10 | |
| 2019/0222608 A1* | 7/2019 | Naccarato | H04L 63/1425 | |
| 2020/0267181 A1* | 8/2020 | Pandey | H04L 63/1466 | |
| 2020/0358819 A1* | 11/2020 | Bowditch | G06F 17/18 | |
| 2020/0366712 A1* | 11/2020 | Onut | H04L 63/1416 | |
| 2021/0168161 A1* | 6/2021 | Dunn | H04L 63/1441 | |
| 2021/0266345 A1* | 8/2021 | Chen | H04L 63/1425 | |
| 2021/0281606 A1* | 9/2021 | Singh | H04L 63/1483 | |
| 2021/0352093 A1* | 11/2021 | Hassanzadeh | H04L 63/1416 | |
| 2021/0360006 A1* | 11/2021 | Kim | G06F 21/562 | |
| 2022/0210188 A1* | 6/2022 | Grewal | H04L 63/1483 | |
| 2022/0294751 A1* | 9/2022 | Slobodyanuk | H04L 51/212 | |
| 2023/0164180 A1* | 5/2023 | Singh | G06N 5/01 | 726/23 |
| 2023/0171287 A1* | 6/2023 | Slobodyanuk | H04L 51/212 | 726/23 |
| 2023/0224326 A1* | 7/2023 | Horesh | H04L 63/1416 | 726/23 |
| 2023/0328034 A1* | 10/2023 | Behera | H04L 63/1483 | 726/22 |

* cited by examiner

200

Configuring a Machine Learning-Based Electronic Communication Classification Model S205

Obtaining Electronic Communication Data associated with a Target Electronic Communication S210

Extracting one or more Corpora of Electronic Communication Feature Vectors from the Target Electronic Communication S220

Computing a Machine Learning-Based Electronic Communication Inference based on the one or more Corpora of Electronic Communication Feature Vectors S230

Routing the Target Electronic Communication based on the Machine Learning-Based Electronic Communication Inference S240

Monitoring and Re-Training an Electronic Communication Machine Learning Classification Model S250

FIGURE 2

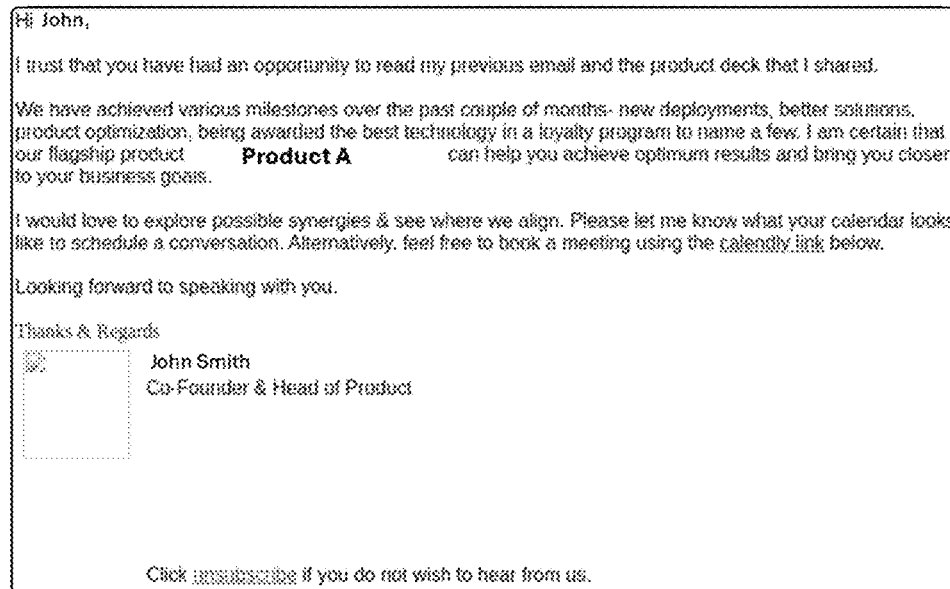
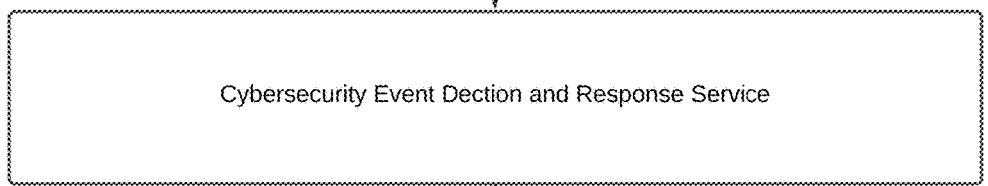
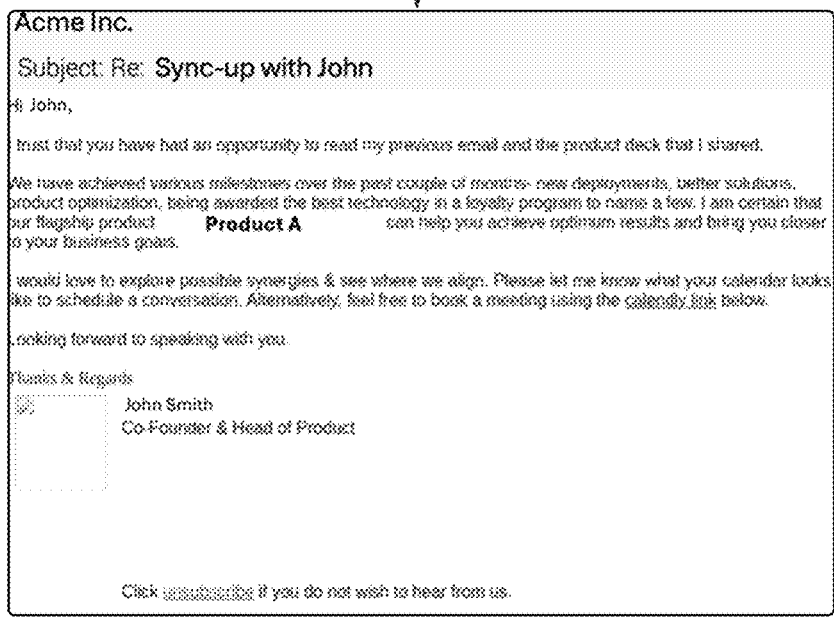
FIGURE 6

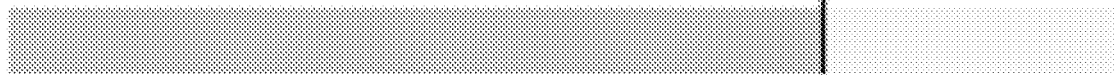
FIGURE 11

FIGURE 12

SYSTEMS AND METHODS FOR INTELLIGENT IDENTIFICATION AND AUTOMATED DISPOSAL OF NON-MALICIOUS ELECTRONIC COMMUNICATIONS

CROSS-REFERENCE TO RELATED APPLICATIONS

This application claims the benefit of U.S. Provisional Application No. 63/463,195, filed on 1 May 2023, U.S. Provisional Application No. 63/454,078, filed on 23 Mar. 2023, and is a continuation-in-part of U.S. patent application Ser. No. 17/970,069, filed on 20 Oct. 2022, which is a continuation of U.S. patent application Ser. No. 17/696,151, filed on 16 Mar. 2022, which is a continuation of U.S. Pat. No. 11,310,270, filed on 14 Oct. 2021, which claims the benefit of U.S. Provisional Application No. 63/091,409, filed 14 Oct. 2020, U.S. Provisional Application No. 63/092,307, filed 15 Oct. 2020, and U.S. Provisional Application No. 63/129,836, filed 23 Dec. 2020, which are incorporated herein in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often shift a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat and/or adverse behavior detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE INVENTION(S)

In one embodiment, a computer-implemented method for accelerating a disposition of non-malicious electronic communications includes receiving, from a subscriber, a request to assess a threat of a third-party electronic communication; extracting one or more corpora of feature vectors from the third-party electronic communication based on providing the third-party electronic communication as input to a feature extractor, wherein extracting the one or more corpora of feature vectors includes: (i) extracting a first corpus of feature vectors likely indicative of whether the third-party electronic communication is of a target non-malicious electronic communication type, and (ii) extracting a second corpus of feature vectors likely indicative of whether the third-party electronic communication is a suspected malicious electronic communication; computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors; automatically attributing a classification label of the target non-malicious electronic communication type to the third-party electronic communication based on the probability of the electronic communication-type classification inference satisfying a minimum electronic communication classification threshold; and automatically routing a security alert associated with the third-party electronic communication to an alert disposal queue based on the third-party electronic communication having the classification label of the target non-malicious electronic communication type.

In one embodiment, the computer-implemented method further includes: in response to automatically routing the security alert associated with the third-party electronic communication to the alert disposal queue: bypassing a cybersecurity investigation into the security alert associated with the third-party electronic communication, wherein the cybersecurity investigation includes executing one or more automated cybersecurity investigation workflows.

In one embodiment, the security alert associated with the third-party electronic communication is automatically generated by a cybersecurity event detection and response service in response to receiving the request from the subscriber, the security alert associated with the third-party electronic communication is routed to a security alert queue based on the cybersecurity event detection and response generating the security alert, and the security alert queue includes a plurality of security alerts, wherein each security alert of the plurality of security alerts is awaiting an alert triage.

In one embodiment, the computer-implemented method further includes: in response to automatically attributing the classification label of the target non-malicious electronic communication type to the third-party electronic communication: automatically tagging the security alert associated with the third-party electronic communication as a closed cybersecurity alert or a resolved cybersecurity alert; and automatically removing the security alert associated with the third-party electronic communication from the security alert queue based on the automatic tagging, wherein automatically removing the security alert associated with the third-party electronic communication from the security alert queue includes automatically routing the security alert associated with the third-party electronic communication to the alert disposal queue.

In one embodiment, the target non-malicious electronic communication type refers to a class of electronic communications that promotes one or more products, one or more services, or one or more events.

In one embodiment, the security alert associated with the third-party electronic communication is automatically closed or automatically resolved in response to routing the security alert associated with the third-party electronic communication to the alert disposal queue.

In one embodiment, the computer-implemented method further includes: obtaining a corpus of training data that includes a plurality of electronic communication training data samples, wherein the corpus of training data includes: (a) a first set of labeled electronic communications, wherein each electronic communication of the first set of labeled electronic communications is labeled as being of the target non-malicious electronic communication type, (b) a second set of labeled electronic communications, wherein each electronic communication of the second set of labeled electronic communications is labeled as not being of the target non-malicious electronic communication type, and (c) a third set of unlabeled electronic communications, wherein the corpus of training data includes more unlabeled electronic communications than labeled electronic communications; and configuring the machine learning-based electronic communication classification model based on a semi-supervised training of a machine learning classification model using the corpus of training data.

In one embodiment, a computer-implemented method for accelerating a disposition of non-malicious electronic communications includes: generating a phishing alert based on receiving a request from a subscriber to assess a threat of a third-party electronic communication, wherein the phishing alert includes a representation of the third-party electronic communication; extracting one or more corpora of feature vectors from the third-party electronic communication based on providing the third-party electronic communication as input to one or more feature extractors, wherein extracting the one or more corpora of feature vectors includes: (i) extracting a first corpus of feature vectors likely indicative of whether the third-party electronic communication is of a target non-malicious electronic communication type, and (ii) extracting a second corpus of feature vectors likely indicative of whether the third-party electronic communication is a suspected malicious electronic communication; computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors; and automatically routing the phishing alert to a security alert queue based on the probability of the electronic communication-type classification inference being below a predetermined minimum electronic communication classification threshold.

In one embodiment, the computer-implemented method further includes: displaying, via a web-accessible user interface, a representation of the phishing alert that includes: (a) the representation of the third-party electronic communication, and (b) a phishing guidance user interface element integrally displayed within the representation of the phishing alert, wherein the phishing guidance user interface element includes the probability of the third-party electronic communication being of the target non-malicious electronic communication type.

In one embodiment, the phishing guidance user interface element further includes: a first distinct section that indicates (b-i) a numerical quantity of a total number of non-malicious indicators identified within the third-party electronic communication and (b-ii) an enumeration of the non-malicious indicators that corresponds to the numerical quantity of the total number of non-malicious indicators identified within the third-party electronic communication, and a second distinct section that indicates (b-iii) a numerical quantity of a total number of malicious indicators identified within the third-party electronic communication and (b-iv) an enumeration of the malicious indicators that corresponds to the numerical quantity of the total number of malicious indicators identified within the third-party electronic communication.

In one embodiment, the computer-implemented method further includes: routing the phishing alert to one of an alert disposal queue or an alert escalation queue based on evaluation of the phishing guidance user interface element.

In one embodiment, a computer-implemented method for accelerating a disposition of non-malicious electronic communications, includes at a cybersecurity event detection and response service: receiving, from a subscriber, a request to assess a threat of a third-party electronic communication; extracting one or more corpora of feature vectors from the third-party electronic communication based on providing the third-party electronic communication as input to one or more feature extractors, wherein extracting the one or more corpora of feature vectors includes: (i) extracting a first corpus of feature vectors likely indicative of whether the third-party electronic communication is of a target non-malicious electronic communication type, and (ii) extracting a second corpus of feature vectors likely indicative of whether the third-party electronic communication is a suspected malicious electronic communication; computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors; automatically attributing a classification label of the target non-malicious electronic communication type to the third-party electronic communication based on the probability of the electronic communication-type classification inference satisfying a minimum electronic communication classification threshold; and automatically routing a security alert that corresponds to the third-party electronic communication to an alert disposal queue based on the third-party electronic communication having the classification label of the target non-malicious electronic communication type.

In one embodiment, one feature of the second corpus of feature vectors indicates whether a return path of the third-party electronic communication matches a sender address of the third-party electronic communication, and the machine learning-based electronic communication classification model uses at least the one feature of the second corpus of feature vectors and a corresponding feature weight to assist with computing the probability of the third-party electronic communication being of the target non-malicious electronic communication type.

In one embodiment, one feature of the second corpus of feature vectors indicates whether a sender domain of the third-party electronic communication was involved in a previous security incident, and the machine learning-based electronic communication classification model uses at least the one feature of the second corpus of feature vectors and a corresponding feature weight to assist with computing the probability of the third-party electronic communication being of the target non-malicious electronic communication type.

In one embodiment, one feature of the first corpus of feature vectors indicates whether a sender of the third-party electronic communication corresponds to a corporate marketing account of an organization, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the first corpus of feature vectors indicates whether the third-party electronic communication includes an unsubscribe feature, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the first corpus of feature vectors indicates a combined number of terms and phrases included in a body of the third-party electronic communication that is likely indicative of the target non-malicious electronic communication type, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the first corpus of feature vectors indicates a chromatic intensity of the third-party electronic communication, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the second corpus of feature vectors indicates a domain age of a sender domain used in the third-party electronic communication, and the machine learning-based electronic communication classification model uses at least the one feature of the second corpus of feature vectors and a corresponding feature weight to assist with computing the probability of the third-party electronic communication being of the target non-malicious electronic communication type.

In one embodiment, one feature of the first corpus of feature vectors indicates a number of digital images embedded in the third-party electronic communication, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the first corpus of feature vectors indicates a total length of the third-party electronic communication, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the first corpus of feature vectors indicates a chromatic intensity of the third-party electronic communication, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the second corpus of feature vectors indicates a domain age of a sender domain used in the third-party electronic communication, and the machine learning-based electronic communication classification model uses at least the one feature of the second corpus of feature vectors and a corresponding feature weight to assist with computing the probability of the third-party electronic communication being of the target non-malicious electronic communication type.

In one embodiment, one feature of the first corpus of feature vectors indicates a combined number of terms and phrases included in a subject of the third-party electronic communication that is likely indicative of the target non-malicious electronic communication type, and the machine learning-based electronic communication classification model uses at least the one feature of the first corpus of feature vectors and a corresponding feature weight to assist with computing the probability of the third-party electronic communication being of the target non-malicious electronic communication type.

In one embodiment, one feature of the second corpus of feature vectors indicates whether the third-party electronic communication includes one or more electronic messaging attachments of a target file type, and the machine learning-based electronic communication classification model uses at least the one feature of the second corpus of feature vectors and a corresponding feature weight to assist with computing the probability of the third-party electronic communication being of the target non-malicious electronic communication type.

In one embodiment, a computer-implemented method for accelerating a disposition of non-malicious electronic communications, includes: generating a phishing alert based on receiving a request from a subscriber to assess a threat of a third-party electronic communication, wherein the phishing alert includes a representation of the third-party electronic communication; extracting one or more corpora of feature vectors from the third-party electronic communication based on providing third-party electronic communication data associated with the third-party electronic communication as input to one or more feature extractors, wherein extracting the one or more corpora of feature vectors includes: (i) extracting a first corpus of feature vectors likely indicative of whether the third-party electronic communication is of a target non-malicious electronic communication type, and (ii) extracting a second corpus of feature vectors likely indicative of whether the third-party electronic communication is a suspected malicious electronic communication; computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors; and automatically closing or automatically resolving the phishing alert based on the probability of the electronic communication-type classification inference satisfying a predetermined minimum electronic communication classification threshold.

In one embodiment, a computer-implemented method for accelerating a disposition of non-malicious electronic communications includes: generating a phishing alert based on receiving a request from a subscriber to assess a threat of a third-party electronic communication, wherein the phishing alert includes a representation of the third-party electronic communication; extracting one or more corpora of feature vectors from the third-party electronic communication based on providing the third-party electronic communication as input to one or more feature extractors, wherein extracting the one or more corpora of feature vectors includes: (i) extracting a first corpus of feature vectors likely indicative of whether the third-party electronic communication is of a target non-malicious electronic communication type, and (ii) extracting a second corpus of feature vectors likely indicative of whether the third-party electronic communication is a suspected malicious electronic communication; computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors; and automatically attributing a classification label of the target non-malicious electronic communication type to the phishing alert based on the probability of the electronic communication-type classification inference satisfying a minimum electronic communication classification threshold; and automatically closing or automatically resolving the phishing alert based on the phishing alert having the classification label of the target non-malicious electronic communication type.

In one embodiment, automatically closing or automatically resolving the phishing alert includes automatically routing the phishing alert to a phishing alert disposal queue based on the phishing alert having the classification label of the target non-malicious electronic communication type.

In one embodiment, the target non-malicious electronic communication type refers to a class of electronic communications that promotes one or more products, one or more services, or one or more events.

In one embodiment, in response to attributing the classification label of the target non-malicious electronic communication type to the phishing alert: automatically removing the phishing alert from a security alert queue and automatically routing the phishing alert to an alert disposal queue.

BRIEF DESCRIPTION OF THE FIGURES

FIG. 2 illustrates an example method 200 in accordance with one or more embodiments of the present application;

FIG. 6 illustrates an example of generating a security alert in accordance with one or more embodiments of the present application;

FIGS. 8-12 illustrate example graphical user interfaces of a system or service implementing method 200 in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
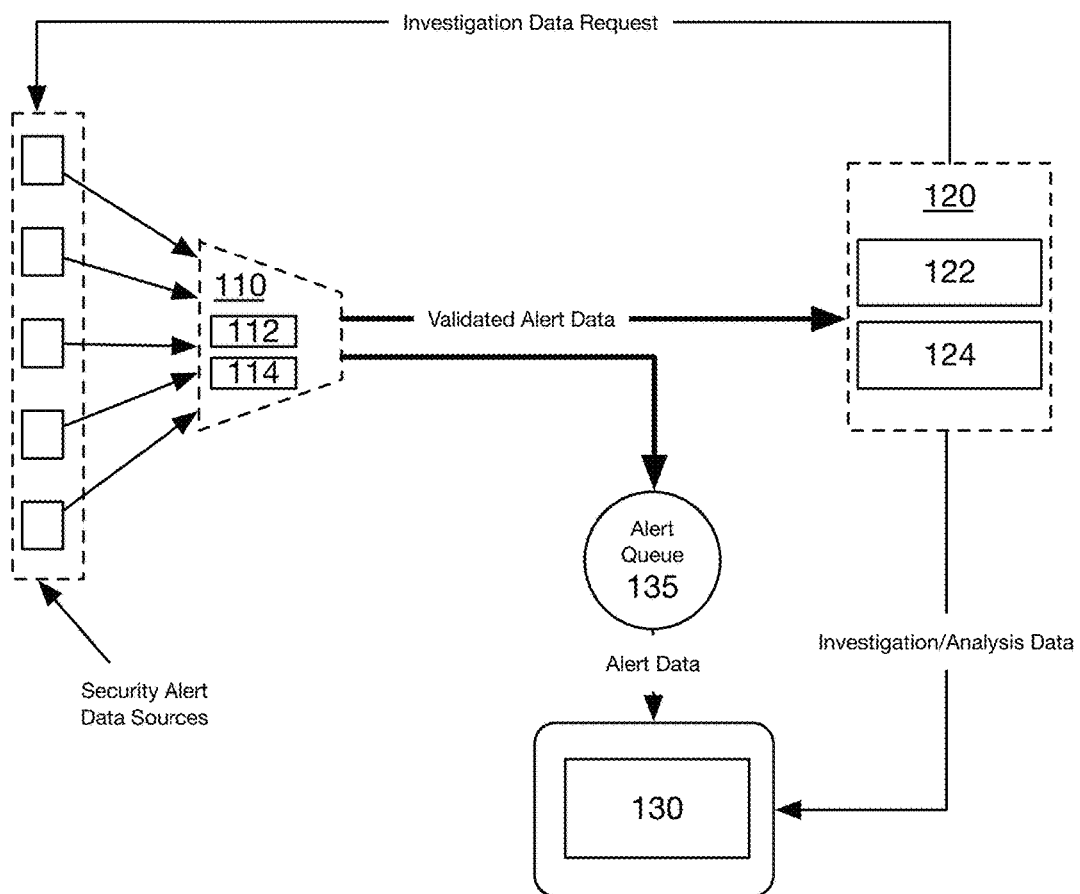
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100, an event detection and response service, and a cybersecurity event detection and response service as described in U.S. Pat. No. 17,488,800, filed on 29 Sep. 2021, which is incorporated herein in its entirety by this reference.

The system 100 may function to enable real-time cybersecurity threat detection, agile, and intelligent threat response for mitigating detected security threats, as described in U.S. Provisional Application No. 63/091,409, which is incorporated herein in its entirety by this reference.

1.1 Security Alert Engine [Josie]

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation and/or a threat mitigation response by the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine [Ruxie]

The automated security investigations engine 120, which may be sometimes referred to herein as the "investigations engine 120", preferably functions to automatically perform investigative tasks for addressing and/or resolving a security alert or security event. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label. That is, in such embodiments, one or more of the plurality of automated investigation workflows may be mapped to at least one of a plurality of distinct validated security alerts or events, such that a detection of the validated security alert or event automatically causes an execution of a mapped or associated automated investigation workflow.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

It shall be noted that, in one or more embodiments, the investigations engine 120 may use a machine learning-based electronic communication classification model and/or the inference outputted by the machine learning-based electronic communication classification model to automatically resolve (i.e., automatically close or the like) a security alert (i.e., a phishing alert or the like).

1.3. Security Mitigation User Interface [Workbench]

The security mitigation user interface 130 may function to enable an analyst or an administrator to perform, in a parallel manner, monitoring, investigations, and reporting of security event incidents, and/or resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible, via the Internet or the like to a subscribing entity.

Accordingly, in or more embodiments, an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

Figure 5:
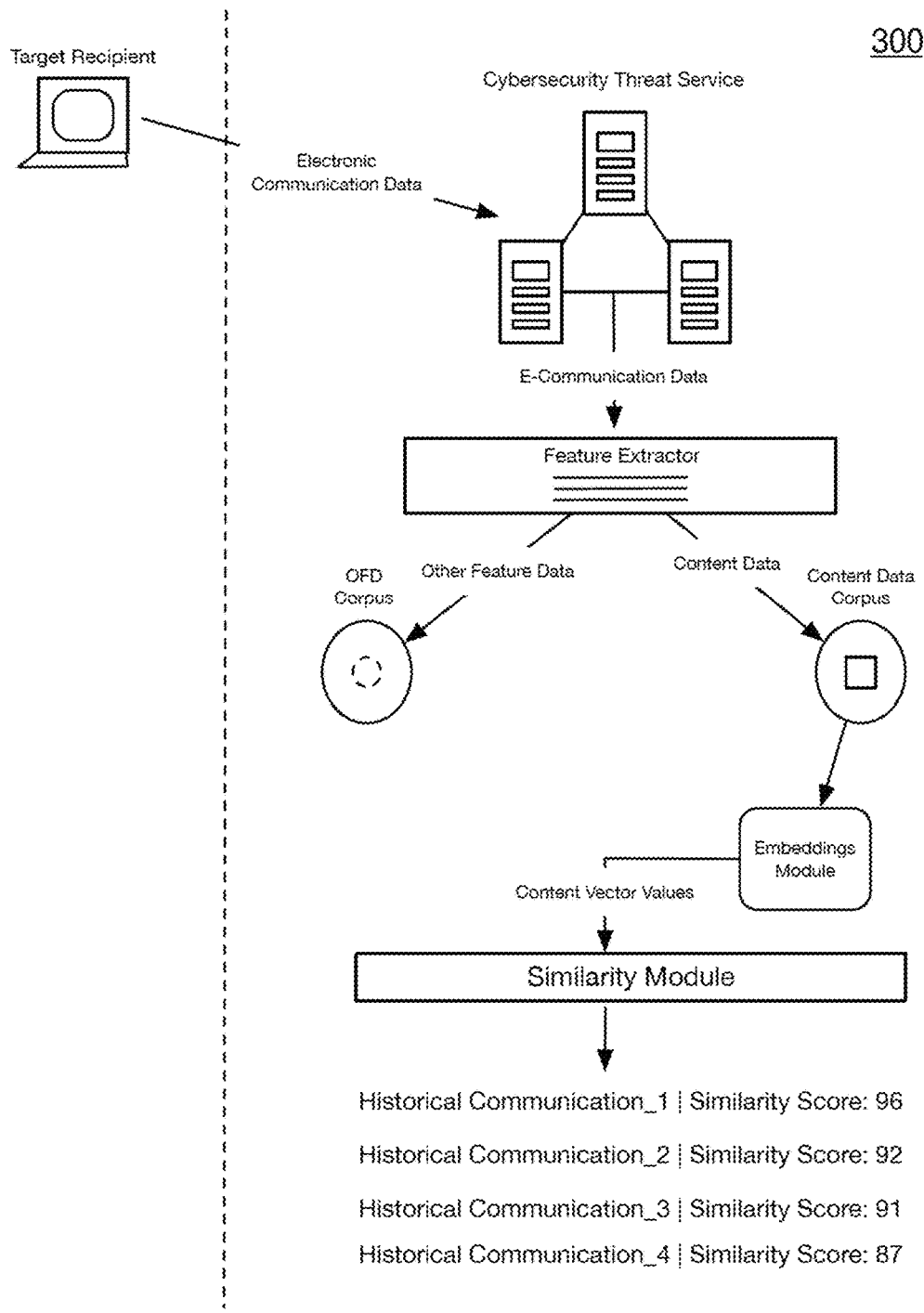
FIG. 5 illustrates a schematic representation of a subsystem of the system 100 in accordance with one or more embodiments of the present application.

1.4 Phishing Engine: Phishing Detection+ Phishing Threat Remediation Subsystem In one or more embodiments, the system 100 includes a phishing engine or subsystem 300 for detecting malicious communications and producing intelligence for rapidly remediating cybersecurity threats resulting from detected malicious communication threats, as shown generally by way of example in FIG. 5.

In a preferred embodiment, the subsystem 300 includes a feature extractor, an embeddings module, and a similarity module. In this preferred embodiment, the feature extractor may function to receive, as input, electronic communication data and extract content data (e.g., an email body or the like) from the electronic communication data. In some embodiments, the feature extractor additionally or alternatively includes a pre-processing module or unit that functions to pre-process the content data in preparation for an embedding service or the like.

In one or more embodiments, the embeddings module may function to compute or generate word and/or sentence embeddings (i.e., semantic vector values) based on the content data extracted from the electronic communication data. In such embodiments, the embeddings module may be implemented with an external embeddings (e.g., Bert-as-a-service or the like) that communicates with the embeddings modules to generate word and/or sentence embeddings.

In one or more embodiments, the similarity module may function to compute similarity metric values based on an evaluation of the embedding values of the content data. In some embodiments, the similarity module may include and/or have access to a database storing one or more corpora of historical electronic communication data (e.g., historical malicious communications, non-malicious communications (e.g., marketing emails, etc.), and/or the like).

1.5 Phishing Subsystem: Automated Disposal of Non-Malicious Electronic Communications of one or more Non-Malicious Electronic Communication Types Additionally, or alternatively, in one or more embodiments, the system 100 may include a phishing subsystem for automated disposal of non-malicious electronic communications. In one or more embodiments, the system 100 or the subsystem 300 may obtain or receive a large volume of distinct requests, from subscribers to the cybersecurity event detection and response service, to assess a threat of a subject third-party electronic communication suspected to have malicious intent. That is, in one or more embodiments, the system 100 or the subsystem 300 may obtain or receive hundreds of daily requests or even thousands of daily requests to investigate third-party electronic communications suspected of malicious intent (i.e., phishing attempts).

Accordingly, in such embodiments, five (5) percent or more, ten (10) percent or more, fifteen (15) percent or more, twenty (20) percent or more, twenty-five (25) percent or more, thirty (30) percent or more, thirty-five (35) percent or more of the daily requests may relate to assessing third-party electronic communications of a target non-malicious electronic communication type, such as marketing-type electronic communications (i.e., emails that are promoting one or more products, one or more services, one or more events, and/or the like). These types of third-party electronic communications are non-malicious and often require a signification portion of an analyst's time for alert triaging. The phishing subsystem, in one or more embodiments, may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the phishing subsystem may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

At least one technical benefit of the system 100 or the subsystem 300 implementing the phishing subsystem may enable a reduction in the number of phishing alerts routed to, pending, and/or included in an alert queue (e.g., the security alert queue 135). By employing one or more machine learning models, such as those mentioned above, the phishing subsystem may automatically and accurately identify non-malicious electronic communications, such as marketing-type electronic communications, and, in turn, automatically remove phishing alerts that correspond to non-malicious electronic communications of a target type from the security alert queue. Thus, enabling security analysts to focus on alerts within the security alert queue that are of a genuine cybersecurity threat.

2. Method for Intelligent Identification and Automated Disposal of Non-Malicious Electronic Communications of a Target Type As shown in FIG. 2, a method 200 for automated identification and disposal of non-malicious electronic communications of a target type may include configuring a machine learning-based electronic communication classification model S205, obtaining electronic communication data associated with a target electronic communication S210, extracting one or more corpora of electronic communication feature vectors from the target electronic communication S220, computing a machine learning-based electronic communication classification inference based on the one or more corpora of electronic communication feature vectors S230, and routing the target electronic communication based on the machine learning-based electronic communication classification inference S240. The method may optionally include monitoring and re-training the machine learning-based electronic communication classification model S250.

Configuring a Machine Learning-Based Electronic Communication Classification Model S205, which includes configuring a machine learning-based electronic communication classification model, may function to configure one or more machine learning-based electronic communication classification models based on one or more corpora of training data. In one or more embodiments, S205 may function to curate or obtain one or more corpora of training data and train a target machine learning-based classification model using the one or more corpora of training data.

In one or more embodiments, a corpus of training data may include one or more of a first set of labeled electronic communications in which each labeled electronic communication of the first set of labeled electronic communications is labeled as being of a target non-malicious electronic communication type (i.e., marketing-type electronic communications), a second set of labeled electronic communications in which each electronic communication of the second set of labeled electronic communications is labeled as not being of the target non-malicious electronic communication type (i.e., not marketing-type electronic communications, "not marketing" emails, or the like), and a third set of unlabeled electronic communications. It shall be noted that, in one or more embodiments, the second set of labeled electronic communications may include a plurality of malicious electronic communications (i.e., malicious emails are a subset of "not marketing" emails) and a plurality of non-malicious electronic communications that are not of the target non-malicious electronic communication type (i.e., non-malicious emails that are not considered marketing). It shall be further noted that, in some embodiments, the corpus of training data may include more unlabeled electronic communications than labeled electronic communications. Accordingly, in one or more embodiments, S205 may function to configure the machine learning-based electronic communication classification model based on a semi-supervised training of a machine learning classification model using the corpus of training data.

In another implementation, a corpus of training data may include a plurality of electronic communication-type informative training data samples structured in a tabular form. In such implementation, each electronic communication-type informative training data sample may correspond to a distinct electronic communication and include various features or data attributes (arranged in columns within the tabular form) that correspond to the distinct electronic communication. For instance, in a non-limiting example, an electronic communication-type informative training data sample may include a first feature that may indicate whether a return path of a subject electronic communication to which the electronic communication-type informative training data sample corresponds matches a sender address of the subject electronic communication, a second feature that may indicate whether a sender domain of the subject electronic communication was involved in a previous security incident and/or previous malicious investigation, a third feature that may indicate if the subject (i.e., email subject) of the subject electronic communication was tagged as being of the target non-malicious electronic communication type (i.e., marketing) by an upstream system or service of the cybersecurity event detection and response service, a fourth feature that may indicate whether a sender of the subject electronic communication corresponds to a corporate marketing account of an organization, a fifth feature that may indicate whether the subject electronic communication includes an unsubscribe feature, a sixth feature that may indicate whether the subject electronic communication includes one or more electronic messaging attachments, a seventh feature that may indicate whether the subject electronic communication includes one or more attachments that corresponds to one or more target attack surfaces as defined by the cybersecurity event detection and response service, an eighth feature that may indicate whether the subject electronic communication was sent from a personal email account (i.e., not a company account), a ninth feature that may indicate a degree of threat severity automatically assigned to the subject electronic communication via one or more automated threat severity tagging heuristics of the cybersecurity event detection and response service, a tenth feature that may indicate whether the subject electronic communication was sent from an entity or corporation known to be abused by attackers (i.e., PayPal®, SharePoint®, DocuSign®, etc.), an eleventh feature that may indicate a quantity (or count) of unique internet domains linked to or referenced within the subject electronic communication, a twelfth feature that may indicate a quantity (or count) of unique uniform resource locators (URLs) linked to or referenced within the subject electronic communication, a thirteenth feature that may indicate a combined number of terms and phrases (i.e., marketing terms and phrases (i.e., webinars, white papers, conferences, etc.)) included in a body (i.e., email body) of the subject electronic communication that is likely indicative of the target non-malicious electronic communication type (i.e., marketing-type electronic communications), a fourteenth feature that may indicate a combined number of terms and phrases (i.e., marketing terms and phrases (i.e., webinars, white papers, conferences, etc.)) included in a subject (i.e., email subject) of the subject electronic communication that is likely indicative of the target non-malicious electronic communication type (i.e., marketing-type electronic communications), a fifteenth feature that may indicate a chromatic intensity or colorfulness of the subject electronic communication, a sixteenth feature that may indicate a total token length of a subject (i.e., email subject) of the subject electronic communication, a seventeenth feature that may indicate a total token length of a body (i.e., email body) of the subject electronic communication, an eighteenth feature that may indicate a count or quantity of the number of explicit terms within the subject electronic communication, a nineteenth feature that may indicate a domain age of a sender domain used in the subject electronic communication, a twentieth feature that may include an embeddings representation of the body (i.e., the email body) of the subject electronic communication, a twenty-first feature that may indicate whether the subject electronic communication includes a file sharing URL (i.e., drive.google.com, Dropbox® file sharing link, Sharepoint® file sharing link, etc.), and a twenty-second feature that may indicate whether the subject electronic communication includes a communication thread. Accordingly, in one or more embodiments, S205 may function to configure the machine learning-based electronic communication classification model based on a semi-supervised training of a machine learning classification model using the corpus of training data.

It shall be recognized that, in one or more embodiments, each electronic communication-type informative training data sample of the corpus of training data may include one or more additional features, a fewer set of features, or a different set of features than as described above.

It shall be further recognized that, in one or more embodiments, any of the above-mentioned features may be of any feature type including, but not limited to, a categorical-type feature, a continuous-type feature, a discrete-type feature, an array-type feature, an embeddings-type feature, and any other type of feature suitable for the analysis and classification of electronic communications.

It shall be further recognized that, in some embodiments, S205 may function to configure the machine learning-based electronic communication classification model based on any suitable training process including using one of a supervised learning technique, an unsupervised learning technique, and a semi-supervised learning technique.

2.10 Obtaining Electronic Communication Data

S210, which includes obtaining electronic communication data, may function to obtain or receive one or more electronic communications from one or more subscribers. In one or more embodiments, S210 may function to receive electronic communication data associated with a subject electronic communication based on a subscriber electronically transmitting the subject electronic communication to a service or system implementing the method 200. It shall be recognized that the phrase "electronic communication" may be interchangeably referred to herein as an "electronic message", a "message" or the like.

In one or more embodiments, each electronic communication of a plurality of distinct electronic communications transmitted to the system or service implementing the method 200 may have an undetermined threat severity level and the system or service implementing the method 200 may function to perform one or more processes to identify a probable threat severity of each of the plurality of distinct electronic communications. Stated another way, a first subset of the plurality of distinct electronic communications may be tagged or identified by the system or service 100 as malicious and a second subset of the plurality of distinct electronic communications may be tagged or identified as non-malicious (e.g., benign). That is, in a non-limiting example, a first electronic communication transmitted to the system or service may be identified or tagged as a malicious electronic communication and a subsequent electronic communication transmitted to the system or service may be tagged or identified as a non-malicious electronic communication (e.g., benign, not malicious, etc.).

Additionally, or alternatively, in one or more embodiments, S210 may function to receive a plurality of distinct electronic communications that correspond to a plurality of distinct electronic communication types including, but not limited to, suspected phishing type electronic communications, non-phishing type electronic communications, and/or unsolicited electronic communications. For instance, in a non-limiting example, S210 may function to obtain or receive a first electronic communication that likely corresponds to a phishing type of electronic communication (e.g., malicious electronic communication class or the like). In the same or another non-limiting example, S210 may function to obtain or receive a second electronic communication that likely corresponds to a non-phishing type of electronic communication (e.g., non-malicious electronic communication class, an unsolicited electronic communication class, and/or the like).

It shall be noted that, in one or more embodiments, the cybersecurity event detection and response service may function to generate a phishing alert based on receiving a request from a subscriber to assess a threat of a third-party electronic communication, as described in U.S. patent application Ser. No. 17/501,708, titled SYSTEMS AND METHODS FOR INTELLIGENT PHISHING THREAT DETECTION AND PHISHING THREAT REMEDIATION IN A CYBER SECURITY THREAT DETECTION AND MITIGATION PLATFORM, which is incorporated in its entirety herein. The phishing alert, in one or more embodiments, may include the third-party electronic communication or a representation of the third-party electronic communication, as shown generally by way of example in FIG. 6, FIG. 8, FIG. 9, FIG. 10, FIG. 12, and FIG. 13.

Exemplary Applications of Obtaining Electronic Communications

In a first implementation, S210 may function to collect (e.g., obtain) one or more electronic communications from a target end user and/or a target recipient of the one or more electronic communications. In such first implementation, the target recipient of a subject electronic communication (e.g., an email or the like) may electronically forward the subject electronic communication to the service or system implementing the method 200. In such embodiments, the forwarding may be made to a designated electronic address for collecting electronic communication messages. Accordingly, based on or in response to the system or service receiving the subject electronic communication, the cybersecurity event detection and response service may function to generate a security alert (i.e., a phishing alert or the like) that corresponds to the subject electronic communication.

Additionally, or alternatively, in a second implementation, S210 may function to collect or receive one or more electronic communications based on a selection of an electronic reporting feature or link. In such second implementation, a target recipient of a subject electronic communication may function to select a phishing reporting feature within an electronic communication interface (e.g., an email inbox or the like) that may automatically route the subject electronic communication to a system, repository, and/or service as described in U.S. patent application Ser. No. 17/501,708, filed on 14 Oct. 2021, which is incorporated herein in its entirety by this reference. Accordingly, based on or in response to the system, repository, and/or service receiving the subject electronic communication, the cybersecurity event detection and response service may function to generate a security alert (i.e., a phishing alert or the like) that corresponds to the subject electronic communication.

2.20 Extracting Electronic Communication Features

S220, which includes extracting electronic communication features, may function to extract one or more corpora of electronic communication feature vectors from a target electronic communication. In one or more embodiments, S220 may function to automatically extract a plurality of electronic communication features from a subject electronic communication based on (or in response to) S210 obtaining or receiving the subject electronic communication.

In one or more embodiments, S210 may function to receive a high-volume of electronic communications of a target electronic communication class or type (e.g., an unsolicited electronic communication class, a marketing class of electronic communications, or the like) that is historically non-malicious, benign, and/or not a security threat. The high-volume of electronic communications of the target electronic communication class may contribute to an unnecessary increase in an (e.g., alert) queue of pending suspicious electronic communications, may require one or more security analysts of the cybersecurity event detection and response service to manually triage each electronic communication of the high-volume of electronic communications, and/or may require a security investigation to be conducted for each electronic communication of the high-volume of electronic communications.

Stated another way, in one or more embodiments, the system or service implementing method 200 may function to generate a plurality of phishing alerts in response to receiving a plurality of third-party electronic communications from a plurality of subscribers to the system or service implementing the method 200. That is, the cybersecurity event detection and response service may function to generate a distinct security alert (i.e., phishing alert) for each distinct third-party electronic communication received from a subscriber that is requesting the cybersecurity event detection and response service to assess a threat of a corresponding third-party electronic communication. Accordingly, in such embodiments, five (5) percent or more, ten (10) percent or more, fifteen (15) percent or more, twenty (20) percent or more, twenty-five (25) percent or more, thirty (30) percent or more, thirty-five (35) percent or more of the plurality of phishing alerts generated by the cybersecurity event detection and response service are associated with (or correspond to) third-party electronic communications of a target non-malicious electronic communication type (i.e., marketing-type electronic communications).

Figure 7:
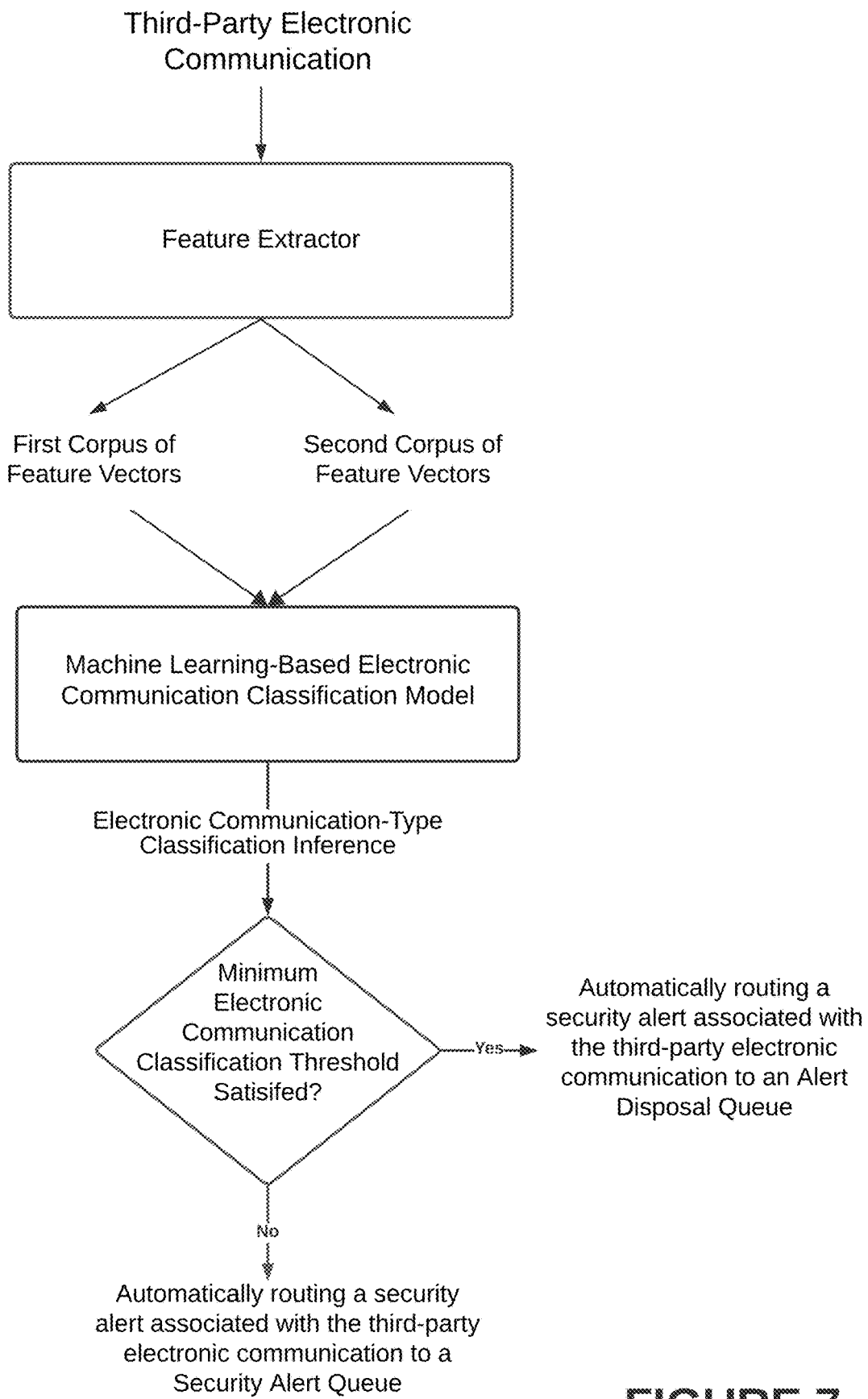
FIG. 7 illustrates a schematic of routing a security alert that corresponds to a third-party electronic communication in accordance with one or more embodiments of the present application.
Figure 8:
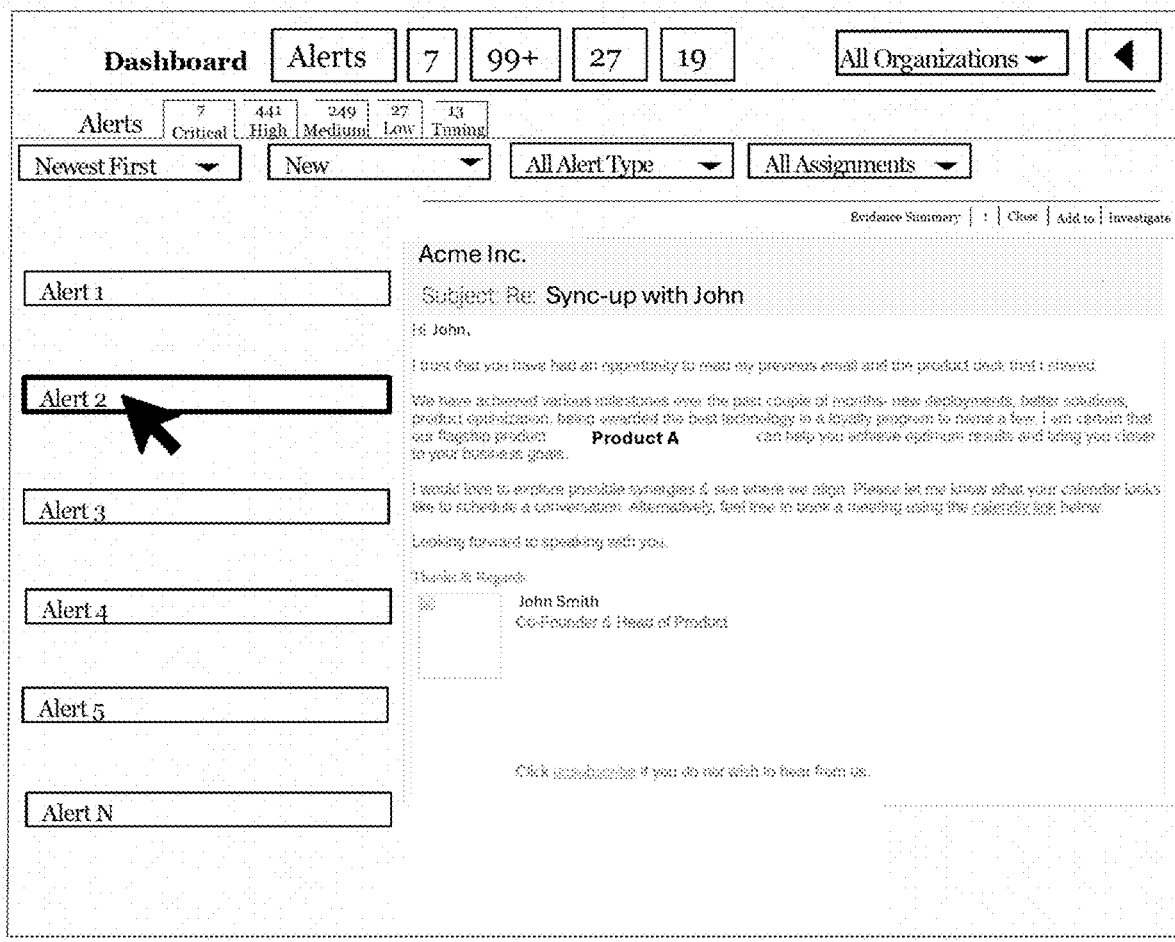
Figure 13:
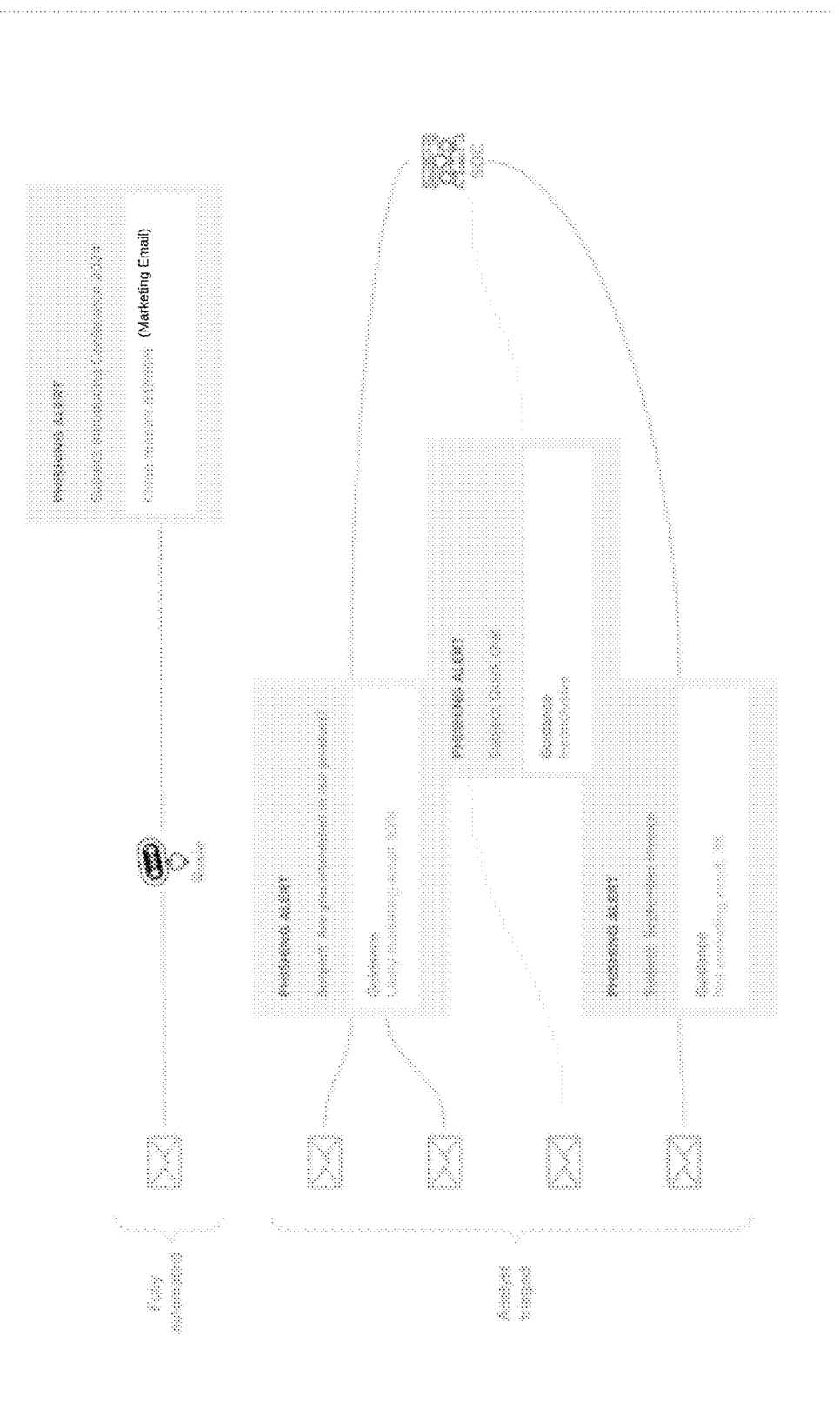
FIG. 13 illustrates an example process flow of a system or service implementing method 200 in accordance with one or more embodiments of the present application.

It shall be recognized that, in some embodiments, each phishing alert (i.e., security alert or the like) generated by the system or service implementing method 200 may be routed to an alert queue (i.e., security alert queue) for alert triaging by a security analyst, as shown generally by way of example in FIG. 7 and FIG. 8. This may result in increased noise within the alert queue, which may make it difficult for analysts to properly assess and remediate malicious alerts, thus leading to analyst burnout. Stated another way, routing each electronic communication (or phishing alert) of the target non-malicious electronic communication type to an alert queue may cause an unnecessary increase in security alerts pending within the alert queue (i.e., the security alert queue) as these types of electronic communications and phishing alerts are not malicious.

Thus, at least one technical advantage of S220 automatically extracting a distinct corpus of electronic communication features from each distinct electronic communication obtained by S210 may enable an electronic communication machine learning classification model (i.e., a machine learning-based electronic communication classification model) to compute (on a per-electronic communication basis) a likelihood that a subject electronic communication corresponds to the target electronic communication class (e.g., the unsolicited electronic communication class, the marketing class of electronic communications, the target non-malicious electronic communication type, marketing-type electronic communications, or the like). Accordingly, in some embodiments, the system or service implementing the method 200 may automatically dispose of electronic communication(s) that map to the target electronic communication class (e.g., the unsolicited electronic communication class, the marketing class of electronic communications, the target non-malicious electronic communication type, marketing-type electronic communications, or the like) to prevent the above-mentioned increase in the (e.g., alert) queue of pending suspicious electronic communications and/or bypass the above-mentioned triaging and security investigations for electronic communications that correspond to the target electronic communication class (i.e., marketing-type electronic communications).

Extracting Electronic Communication Type-Informative Features

In one or more embodiments, S220 may function to implement a feature extractor or a feature extractor system that may function to extract a feature dataset (e.g., a corpus of electronic communication features) from each inbound electronic communication. In such embodiments, the feature extractor or the feature extractor system may function to extract, from a target electronic communication, a representation of the target electronic communication, and/or electronic communication data associated with the target electronic communication, a plurality of distinct electronic communication type-informative features that may be indicative of an electronic communication class (or type) associated with the target electronic communication.

In one or more embodiments, using one or more feature extractors or one or more feature extractor systems, S220 may function to extract one or more corpora of feature vectors based on providing, as input, a target electronic communication, a representation of the target electronic communication, and/or electronic communication data associated with the target electronic communication, to the one or more feature extractors. In such embodiments, a single feature extractor or a plurality of feature extractors may function to extract a first corpus of feature vectors likely indicative of whether a subject third-party electronic communication is of a target non-malicious electronic communication type (i.e., marketing-type electronic communications) and a second corpus of feature vectors likely indicative of whether the subject third-party electronic communication is a suspected malicious electronic communication. It shall be recognized that extracting the above-described corpora of feature vectors may enable the machine learning-based electronic communication classification model to accurately distinguish between electronic communications of the target non-malicious electronic communication type and suspected malicious electronic communications (i.e., phishing electronic communications, electronic communications that visually appear like a marketing-type electronic communication but includes a plurality of suspicious/malicious indicators).

(i) Electronic Communication Colorfulness Features

In one or more embodiments, S220 may function to extract an electronic communication chromatic intensity feature (e.g., colorfulness feature) from a target inbound electronic communication (i.e., third-party electronic communication or the like). In such embodiments, the electronic communication chromatic intensity feature may be highly correlated and/or an indicative signal of the unsolicited electronic communication class (e.g., the marketing class of electronic communications, marketing-type electronic communications, or the like). The electronic communication chromatic intensity feature may be a quantitative representation of a degree of chromatic intensity (e.g., colorfulness) associated with a subject inbound electronic communication.

It shall be recognized that electronic communications of the unsolicited electronic communication class (e.g., the marketing class of electronic communications or the like) may historically include contrasting graphics, text, or the like to engage or increase a likelihood of one or more target recipients to review and/or engage with unsolicited electronic communications (e.g., marketing-type electronic communications). Thus, in one or more embodiments, an electronic communication chromatic intensity feature extracted from a target inbound electronic communication that indicates an occurrence of one or more large variations between RGB components (i.e., red, green, and blue components) of an image representation of the target inbound electronic communication may support a classification inference, via the electronic communication machine learning classification model, that the target inbound electronic communication is likely of the unsolicited electronic communication class (e.g., a marketing-type electronic communication).

Alternatively, in a non-limiting example, an electronic communication chromatic intensity feature extracted from a target inbound electronic communication that indicates a minimal amount of RGB variation between RGB components of an image representation of the target inbound electronic communication may support a classification inference, by the electronic communication machine learning classification model, that the target inbound electronic communication is likely not of the unsolicited electronic communication class (e.g., not a marketing-type electronic communication).

It shall be recognized that, in some embodiments, a minimal amount of RGB variation may be indicative of a subclass of marketing-type electronic communications, such as salesperson outreach-type electronic communications. In such a non-limiting example, an electronic communication chromatic intensity feature extracted from a target inbound electronic communication that indicates a minimal amount of RGB variation between RGB components of an image representation of the target inbound electronic communication may support a classification inference, by the electronic communication machine learning classification model, that the target inbound electronic communication is likely a subclass of marketing-type electronic communications. It shall be further recognized, in such embodiments, a subject electronic communication may be determined to have a minimal amount of RGB variation when the electronic communication chromatic intensity feature extracted from the subject electronic communication fails to satisfy a pre-determined minimum RGB variation threshold.

Accordingly, in one or more embodiments, S220 may function to automatically extract the electronic communication chromatic intensity feature from the target inbound electronic communication based on an automated assessment of an image representation (e.g., screenshot representation, etc.) of the target inbound electronic communication. For instance, in a non-limiting example, the electronic communication chromatic intensity feature extracted from a first inbound electronic communication may indicate that the first inbound electronic communication is colorful based on identifying that one or more large variations exist between RGB components of the image representation of the first inbound electronic communication. In another non-limiting example, the electronic communication chromatic intensity feature extracted from a second inbound electronic communication may indicate that the second inbound electronic communication is not colorful based on identifying that a negligible, small, or minor variation exists between RGB components of the image representation of the second inbound electronic communication.

Stated another way, in one or more embodiments, one feature of the first corpus of feature vectors may indicate a chromatic intensity of a subject third-party electronic communication and the machine learning-based electronic communication classification model may use at least the one feature of the first corpus of feature vectors and a corresponding feature weight to assist with computing the probability (i.e., confidence score) that the subject third-party electronic communication is of the target non-malicious electronic communication type (i.e., marketing-type electronic communications, etc.). It shall be noted that, in some embodiments, the value of the feature representing the chromatic intensity of the subject third-party electronic communication may range between zero (0) and one hundred (100) (i.e., a lower value such as zero may indicate a lack of color variation, whereas a higher value like one-hundred may indicate that a subject third-party electronic communication is very colorful with significant variation in RGB components). It shall be further noted that some types of marketing-type electronic communications may be very colorful.

(ii) Electronic Communication Vocabulary Features

Additionally, or alternatively, in one or more embodiments, S220 may function to extract one or more electronic communication vocabulary features from the target inbound electronic communication. In such embodiments, each of the one or more electronic communication vocabulary features may be highly correlated and/or an indicative signal of the unsolicited electronic communication class (e.g., the marketing class of electronic communications or the like) as each distinct electronic communication vocabulary feature corresponds to a distinct token and/or distinct string of tokens (e.g., whitepaper, unsubscribe, conference, etc.) commonly observed in electronic communications of the unsolicited electronic communication class (i.e., marketing-type electronic communications). It shall be noted that, in some embodiments, each of the one or more electronic communication vocabulary features may be a categorical feature that quantitatively indicates whether a distinct token or string of tokens occurs within the target inbound electronic communication.

In one or more embodiments, the system or service implementing the method 200 may function to construct an unsolicited electronic communication vocabulary corpus (e.g., marketing electronic communication vocabulary corpus) that includes a plurality of distinct electronic communication tokens and/or a plurality of distinct electronic communication token strings frequently present or observed in a corpus of historical unsolicited electronic communications (e.g., a corpus of historical marketing electronic communications or the like) in which each distinct electronic communication token and/or each distinct electronic communication token string included in the unsolicited electronic communication vocabulary corpus satisfies a minimum token frequency/occurrence threshold. Thus, each distinct electronic communication vocabulary feature corresponds to a distinct electronic communication token or token string included in the unsolicited electronic communication vocabulary corpus.

Accordingly, in a non-limiting example, based on an automated evaluation of a target inbound electronic communication, a first electronic communication vocabulary feature may be encoded to include a numerical value (e.g., a zero (0) or a one (1)) to indicate whether a distinct electronic communication token (e.g., whitepaper) that corresponds to the first electronic communication vocabulary feature occurred in a body and/or header of the target inbound electronic communication. Additionally, or alternatively, in another non-limiting example, based on an evaluation of the target inbound electronic communication, a second electronic communication vocabulary feature may be encoded to include a numerical value (e.g., a zero (o) or a one (1)) to indicate whether a distinct electronic communication token (e.g., unsubscribe) that corresponds to the second electronic communication vocabulary feature occurred in the body and/or header of the target inbound electronic communication. Additionally, or alternatively, in another non-limiting example, based on an evaluation of the target inbound electronic communication, a third electronic communication vocabulary feature may be encoded to include a numerical value (e.g., a zero (o) or a one (1)) to indicate whether a distinct electronic communication token (e.g., conference) that corresponds to the third electronic communication vocabulary feature occurred in the body and/or header of the target inbound electronic communication.

Additionally, or alternatively, in one or more embodiments, one feature of the first corpus of feature vectors may indicate a combined number of terms and phrases (i.e., conferences, webinar, white papers, free trial, etc.) included in a body (i.e., email body or the like) of a subject third-party electronic communication (i.e., email) that is likely indicative of the target non-malicious electronic communication type (i.e., marketing-type electronic communications). For instance, in a non-limiting example, the value of the feature representing the count of marketing-related terms within an email body of the subject third-party electronic communication may be any numerical integer or whole number. It shall be noted that, in one or more embodiments, the machine learning-based electronic communication classification model may use at least the one feature of the first corpus of feature vectors and a corresponding feature weight to assist with computing a probability of the subject third-party electronic communication being of the target non-malicious electronic communication type (i.e., marketing-type electronic communication). It shall be further noted that, in some embodiments, a high count of marketing-related terms (i.e., greater than two marketing-related terms, greater than five marketing-related terms, greater than ten marketing-related terms, etc.) could correspond to a higher probability of the subject third-party electronic communication being of the target non-malicious electronic communication type. Conversely, a low count of marketing-related terms, particularly approaching zero occurrences, may correspond to a lower probability of the subject third-party electronic communication falling into the target non-malicious electronic communication type.

Additionally, or alternatively, in one or more embodiments, one feature of the first corpus of feature vectors may indicate a combined number of terms and phrases (i.e., conferences, webinar, white papers, free trial, etc.) included in a subject (i.e., email subject or the like) of a subject third-party electronic communication (i.e., email) that is likely indicative of the target non-malicious electronic communication type (i.e., marketing-type electronic communications). For instance, in a non-limiting example, the value of the feature representing the count of marketing-related terms within an email subject of the subject third-party electronic communication may be any numerical integer or whole number. It shall be noted that, in one or more embodiments, the machine learning-based electronic communication classification model may use at least the one feature of the first corpus of feature vectors and a corresponding feature weight to assist with computing a probability of the subject third-party electronic communication being of the target non-malicious electronic communication type (i.e., marketing-type electronic communication). It shall be further noted that, in some embodiments, a high count of marketing-related terms (i.e., greater than two marketing-related terms, greater than five marketing-related terms, greater than ten marketing-related terms, etc.) could correspond to a higher probability of the subject third-party electronic communication being of the target non-malicious electronic communication type. Conversely, a low count of marketing-related terms, particularly approaching zero occurrences, may correspond to a lower probability of the subject third-party electronic communication falling into the target non-malicious electronic communication type.

(iii) Electronic Communication Embeddings Features

Additionally, or alternatively, in one or more embodiments, the system or service implementing the method 200 may function to implement a machine learning-based embeddings model that may function to compute an embeddings representation (e.g., numerical representation) of a body (e.g., email body, text body or the like) of a target electronic communication (e.g., email). As described in more detail herein, an embeddings representation of a target inbound electronic communication may be highly correlated and/or an indicative signal of the unsolicited electronic communication class. In a preferred embodiment, to compute an embeddings representation of a target electronic communication, S220 may function to implement or access a word, sentence, or text embeddings service or an embeddings module (e.g., a component of subsystem 300).

In one or more embodiments, S220 may function to extract a plurality of distinct strings of text from a body (e.g., email body, text body, etc.) of the target electronic communication (e.g., target email) and compute text representations or embedding representations based on the strings of text. Preferably, each distinct string of text (e.g., each distinct sentence or the like) extracted from the body of the target electronic communication may be fed (or passed) as input to an embeddings model that may function to map each distinct string of text to vectors of real numbers or the like in an n-dimensional space.

It shall be recognized that electronic communications of the unsolicited electronic communication class (e.g., the marketing class of electronic communications or the like) may include persuasive language or text to engage a target recipient to perform a target activity, event, and/or transaction. Therefore, as the word, sentence, or text embeddings service (or the embeddings module) may function to generate a plurality of distinct text representations in which words or a string of text (e.g., a sentence or the like) having a similar meaning may have a similar (embeddings) representation, the embeddings data computed for a target inbound electronic communication may be used as model input to the electronic communication machine learning classification model for assisting in a computation of whether the target inbound electronic communication is or is not of the unsolicited electronic communication class (e.g., the marketing class of electronic communications or the like) as electronic communications having persuasive language will have similar embeddings representations and electronic communications not having persuasive language will have different embeddings representations than the embeddings representations that correspond to electronic communications having persuasive language.

In other words, in one or more embodiments, one feature of the first corpus of feature vectors may include representing the entire email body of a subject third-party electronic communication using text embeddings. That is, the embedding value associated with the embedding-type feature may indicate the semantic similarity or dissimilarity between the email content of the subject third-party electronic communication with respect to a set of embedding values of the target non-malicious electronic communication type (i.e., marketing-type electronic communications) and/or a set of embedding values not of the target non-malicious electronic communication type (i.e., not marketing-type electronic communications).

Additionally, or alternatively, in one or more embodiments, one feature of the first corpus of feature vectors may indicate whether a subject (i.e., email subject) of a subject third-party electronic communication was tagged as being of the target non-malicious electronic communication type (i.e., marketing-type electronic communication) by an upstream service or module of the cybersecurity event detection and response service. Accordingly, the machine learning-based electronic communication classification model may use at least the one feature of the first corpus of feature vectors and a corresponding feature weight to assist with computing a probability of the subject third-party electronic communication being of the target non-malicious electronic communication type. In other words, the cybersecurity event detection and response service may incorporate external knowledge or data to increase an inferential accuracy of the machine learning-based electronic communication classification model.

Additionally, or alternatively, in one or more embodiments, one feature of the first corpus of feature vectors may indicate whether a sender of a subject third-party electronic communication corresponds to a corporate marketing account (i.e., marketing@acme.com) of an organization. Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) may typically be sent from corporate marketing accounts. Thus, when the corporate marketing account-type feature indicates that the sender of the subject third-party electronic communication corresponds to a corporate marketing account (i.e., marketing@acme.com) it may suggest a higher likelihood of the subject third-party electronic communication corresponding to the target non-malicious electronic communication type.

Additionally, or alternatively, in one or more embodiments, one feature of the first corpus of feature vectors may indicate whether a subject third-party electronic communication includes an unsubscribe feature (i.e., unsubscribe link, unsubscribe button, unsubscribe user interface object, or the like). Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) may typically include an unsubscribe feature. Thus, when the unsubscribe-type feature indicates that the subject third-party electronic communication includes an unsubscribe button or the like, the machine learning-based electronic communication classification model may predict with a higher confidence or accuracy that the subject third-party electronic communication is of the target non-malicious electronic communication type (i.e., marketing-type electronic communications).

Additionally, or alternatively, in one or more embodiments, one feature of the first corpus of feature vectors may indicate whether a subject third-party electronic communication includes one or more attachments (i.e., email attachments or the like). Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) are less likely to include attachments, instead opting for hyperlinks for content dissemination. For instance, in a non-limiting example, when the machine learning-based electronic communication classification model detects and/or identifies the presence of email attachments within a subject third-party electronic communication, it may lower the probability of categorizing the subject third-party electronic communication as belonging to the target non-malicious electronic communication type (i.e., marketing-type electronic communications).

Additionally, or alternatively, in one or more embodiments, one feature of the first corpus of feature vectors may indicate whether a subject third-party electronic communication was sent from a personal email account (i.e., john.doe@gmail.com). Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) are less likely to be sent from a personal email account. For instance, in a non-limiting example, when the machine learning-based electronic communication classification model detects and/or identifies that a subject electronic communication was sent from a personal email account (i.e., john.doe@gmail.com), it may lower the probability of categorizing or classifying the subject electronic communication as belonging to the target non-malicious electronic communication type (i.e., marketing-type electronic communications).

Additionally, or alternatively, in one or more embodiments, one feature of the first corpus of feature vectors may indicate a total token length or a total character length of a subject third-party electronic communication. Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) are typically shorter emails (i.e., below a predetermined number of tokens or below a predetermined number of characters). For instance, in a non-limiting example, when the machine learning-based electronic communication classification model detects and/or identifies that a subject electronic communication has a total token count or total character count below a service-defined token or character threshold, it may increase the probability or likelihood of categorizing or classifying the subject electronic communication as belonging to the target non-malicious electronic communication type (i.e., marketing-type electronic communications).

Additionally, or alternatively, in one or more embodiments, one feature of the first corpus of feature vectors may indicate whether a body of a subject third-party electronic communication includes explicit terms. Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) do not use explicit terms. For instance, in a non-limiting example, when the machine learning-based electronic communication classification model detects and/or identifies that a subject electronic communication includes explicit terms, it may decrease the probability or likelihood of categorizing or classifying the subject electronic communication as belonging to the target non-malicious electronic communication type (i.e., marketing-type electronic communications).

Additionally, or alternatively, in one or more embodiments, one feature of the first corpus of feature vectors may indicate a total count of distinct or unique domains referenced within a subject third-party electronic communication. Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) typically include at least a plurality of unique domains to reference external content. For instance, in a non-limiting example, when the machine learning-based electronic communication classification model detects and/or identifies that a subject electronic communication includes a plurality of unique domains, it may increase the probability or likelihood of categorizing or classifying the subject electronic communication as belonging to the target non-malicious electronic communication type (i.e., marketing-type electronic communications).

Additionally, or alternatively, in one or more embodiments, one feature of the first corpus of feature vectors may indicate a total count of distinct unique resource locators (URL) domains referenced within or digitally linked to a subject third-party electronic communication. Accordingly, the machine learning-based electronic communication classification model may use at least the one feature of the first corpus of feature vectors and a corresponding feature weight to assist with computing a probability of the subject third-party electronic communication being of the target non-malicious electronic communication type. It shall be noted that electronic communications of the target non-malicious electronic communication type (i.e., marketing-type electronic communications) typically include at least a plurality of unique domains to reference external content. For instance, in a non-limiting example, when the machine learning-based electronic communication classification model detects and/or identifies that a subject electronic communication includes a plurality of URLs, it may increase the probability or likelihood of categorizing or classifying the subject electronic communication as belonging to the target non-malicious electronic communication type (i.e., marketing-type electronic communications).

Extracting Electronic Communication Threat Informative Features

Additionally, in some embodiments, a feature extractor or a feature extractor system may function to extract, from a target electronic communication or electronic communication data associated with the target electronic communication, a plurality of distinct electronic communication threat-informative features that may be indicative of a threat severity of the target electronic communication. At least one technical advantage of extracting threat informative features may prevent or reduce a likelihood of the electronic communication machine learning classification model from mis-classifying malicious electronic communications to the unsolicited electronic communication class (e.g., the marketing class of electronic communications) that visually, textually, and/or contextually appears to be of the unsolicited electronic communication class (e.g., marketing-type electronic communications). It shall be noted that a malicious electronic communication (e.g., phishing electronic communication or the like), as generally referred to herein, may be generated with malicious and/or fraudulent intent for purposes of committing one or more fraudulent acts or otherwise, performing one or more malicious attacks based on information obtained from and/or actions performed by the recipient of the electronic communication.

(i) Electronic Communication Sender Domain Features

In one or more embodiments, S220 may function to extract one or more electronic communication sender domain features from a target inbound electronic communication.

In one or more embodiments, S220 may function to extract, from a target inbound electronic communication, a sender domain to identify a domain age of the sender domain. In such embodiments, the age (or a representation of the age) of the sender domain may be provided, as model input, to the electronic communication machine learning classification model for assessing a probable maliciousness of the target inbound electronic communication. It shall be recognized that an age of the sender domain may be an indicative signal of a malicious electronic communication when the age of the sender domain is less than a minimum sender domain age threshold (e.g., six months, one year, etc.) as new or recently registered sender domains can be suspicious.

Stated another way, in one or more embodiments, one feature of the second corpus of feature vectors may indicate a domain age of a sender domain used in a subject third-party electronic communication. Accordingly, in such embodiments, the machine learning-based electronic communication classification model may use at least the one feature of the second corpus of feature vectors and a corresponding feature weight to assist with computing a probability of the subject third-party electronic communication being of the target non-malicious electronic communication type. For instance, in a non-limiting example, when the machine learning-based electronic communication classification model detects and/or identifies that a subject electronic communication is sent from a sender domain that is newly registered (i.e., less than six months old or the like), it may decrease the probability or likelihood of categorizing or classifying the subject electronic communication as belonging to the target non-malicious electronic communication type (i.e., marketing-type electronic communications) as newly registered domains tend to be suspicious.

Additionally, or alternatively, in one or more embodiments, S220 may function to extract, from a target inbound electronic communication, a sender domain to identify, via one or more computers, whether the sender domain was involved in a historical malicious cybersecurity investigation performed by the cybersecurity event detection and response service (e.g., the system or service 100). In such embodiments, a historical sender domain reputation or a representation of the historical sender domain reputation may be provided, as model input, to the electronic communication machine learning classification model for assessing a probable maliciousness of the target inbound electronic communication. It shall be recognized that a sender domain previously involved in a malicious cybersecurity investigation may be an indicative signal of a malicious electronic communication and, conversely, a sender domain not previously involved in a malicious cybersecurity investigation may be an indicative signal of a non-malicious electronic communication.

Additionally, or alternatively, in one or more embodiments, S220 may function to extract one or more electronic communication features from a target electronic communication associated with whether the target electronic communication includes a document attachment (e.g., malicious document attachment, non-malicious document attachment, etc.) or the like.

Additionally, or alternatively, in one or more embodiments, S220 may function to extract one or more electronic communication features from a target electronic communication associated with whether the electronic communication return path (e.g., email return path) differs from a sender of the target electronic communication.

It shall be noted that S220 may function to extract additional electronic communication features, fewer electronic communication features, or different electronic communication features in other embodiments without departing from the scope of the claimed invention.

For instance, in one non-limiting example, S220 may function to extract a feature from a subject third-party electronic communication that may indicate whether a return path of the subject third-party electronic communication matches a sender address of the subject third-party electronic communication. That is, in one or more embodiments, one feature of the second corpus of feature vectors may indicate whether a return path of the third-party electronic communication is equivalent to a sender address of the third-party electronic communication. It shall be noted that the subject third-party electronic communication may be suspicious or have malicious intent if the return path of the third-party electronic communication does not match the sender address of the third-party electronic communication. Accordingly, in one or more embodiments, the machine learning-based electronic communication classification model may use at least the one feature of the second corpus of feature vectors and a corresponding feature weight to assist with computing a probability of the third-party electronic communication being of the target non-malicious electronic communication type.

Stated another way, in one or more embodiments, one feature of the second corpus of feature vectors may indicate whether a return path of the third-party electronic communication is equivalent to a sender address of the third-party electronic communication. It shall be noted that the subject third-party electronic communication may have malicious intent if the return path of the third-party electronic communication does not match the sender address of the third-party electronic communication. Accordingly, in one or more embodiments, the machine learning-based electronic communication classification model may use at least the one feature of the second corpus of feature vectors and a corresponding feature weight to assist with computing a probability of the third-party electronic communication being of the target non-malicious electronic communication type (i.e., marketing-type electronic communications).

Additionally, or alternatively, in another non-limiting example, S220 may function to extract a feature from a subject third-party electronic communication that may indicate whether a sender domain of the third-party electronic communication was involved in a previous security incident. The cybersecurity event detection and response service may determine whether the sender domain was involved in a previous security incident by searching or performing a lookup within a database of records containing known sender domain that caused security incidents. It shall be recognized that a subject third-party electronic communication may have malicious intent when the sender domain (i.e., john.doe@example.com) was associated with or involved in a historical cybersecurity investigation that identified the sender domain (i.e., john.doe@example.com) as malicious. Accordingly, in one or more embodiments, the machine learning-based electronic communication classification model may use at least the one feature of the second corpus of feature vectors and a corresponding feature weight to assist with computing a probability of a subject third-party electronic communication being of the target non-malicious electronic communication type (i.e., marketing-type electronic communications).

Additionally, or alternatively, in another non-limiting example, S220 may function to extract a feature from a subject third-party electronic communication that may indicate whether a sender of a third-party electronic communication was from a corporation or organization historically known (by the cybersecurity event detection and response service) to be abused by attackers (i.e., PayPal®, SharePoint®, DocuSign®, etc.). The cybersecurity event detection and response service may determine whether a domain of a sender is suspicious by searching or performing a lookup within a database of records containing known sender domain that previously caused security incidents and/or historically known by the cybersecurity event detection and response service to be abused by attackers. It shall be recognized that a subject third-party electronic communication may have malicious intent when the sender of a subject third-party electronic communication was from a company domain or organization domain that is included in the database of records containing known sender domains that previously caused security incidents and/or historically known by the cybersecurity event detection and response service to be abused by attackers. Accordingly, in one or more embodiments, the machine learning-based electronic communication classification model may use at least the one feature of the second corpus of feature vectors and a corresponding feature weight to assist with computing a probability of a subject third-party electronic communication being of the target non-malicious electronic communication type (i.e., marketing-type electronic communications). For instance, in a non-limiting example, when the machine learning-based electronic communication classification model detects and/or identifies that a subject electronic communication was sent from an organization account (i.e., organization domain) or corporate account (i.e., corporate domain) historically abused by attackers, it may decrease the probability or likelihood of categorizing or classifying the subject electronic communication as belonging to the target non-malicious electronic communication type (i.e., marketing-type electronic communications).

Additionally, or alternatively, in one or more embodiments, one feature of the second corpus of feature vectors may indicate a degree of threat or threat severity that was assigned to a subject third-party electronic communication by one or more automated threat detection workflows, one or more automated threat severity assessment workflows (i.e., YARA rules, etc.), an upstream service or module of the cybersecurity event detection and response service, and/or the like. Accordingly, the machine learning-based electronic communication classification model may use at least the one feature of the second corpus of feature vectors and a corresponding feature weight to assist with computing a probability of the subject third-party electronic communication being of the target non-malicious electronic communication type. In other words, the cybersecurity event detection and response service may incorporate external knowledge or data to increase an inferential accuracy of the machine learning-based electronic communication classification model.

Additionally, or alternatively, in one or more embodiments, one feature of the second corpus of feature vectors may indicate whether a subject third-party electronic communication includes one or more attachments (i.e., email attachments or the like) of a suspected malicious file type of a plurality of predetermined suspected malicious file types (i.e., spreadsheets, compressed files, etc.). In one or more embodiments, the plurality of predetermined suspected malicious file types (i.e., spreadsheets, compressed files, etc.) may be defined by the cybersecurity event detection and response service. Accordingly, the machine learning-based electronic communication classification model may use at least the one feature of the second corpus of feature vectors and a corresponding feature weight to assist with computing a probability of the subject third-party electronic communication being of the target non-malicious electronic communication type (i.e., marketing-type electronic communications). It shall be noted that electronic communications that include one or more attachments that correspond to one or more of the plurality of predetermined suspected malicious file types are suspected malicious electronic communications and less likely to be marketing-type electronic communications. For instance, in a non-limiting example, when the machine learning-based electronic communication classification model detects and/or identifies the presence of an email attachment that corresponds to a suspected malicious file type within a subject third-party electronic communication, it may lower the probability of categorizing the subject third-party electronic communication as belonging to the target non-malicious electronic communication type (i.e., marketing-type electronic communications). It shall be noted that, in some embodiments, the plurality of predetermined suspected malicious file types may correspond to or be associated with a predetermined set of attack surfaces.

Additionally, or alternatively, in one or more embodiments, one feature of the second corpus of feature vectors may indicate whether a subject third-party electronic communication includes a file sharing URL. Accordingly, in one or more embodiments, the machine learning-based electronic communication classification model may use at least the one feature of the second corpus of feature vectors and a corresponding feature weight to assist with computing a probability of the subject third-party electronic communication being of the target non-malicious electronic communication type (i.e., marketing-type electronic communications). It shall be noted that electronic communications that include a file sharing URL may be indicative of credential harvesting and, thus, less likely to be marketing-type electronic communications. For instance, in a non-limiting example, when the machine learning-based electronic communication classification model detects and/or identifies the occurrence of a file sharing URL within a subject third-party electronic communication, it may lower the probability of categorizing the subject third-party electronic communication as belonging to the target non-malicious electronic communication type (i.e., marketing-type electronic communications).

Additionally, or alternatively, in one or more embodiments, one feature of the second corpus of feature vectors may indicate whether a subject third-party electronic communication includes a communication thread. Accordingly, in one or more embodiments, the machine learning-based electronic communication classification model may use at least the one feature of the second corpus of feature vectors and a corresponding feature weight to assist with computing a probability of the subject third-party electronic communication being of the target non-malicious electronic communication type (i.e., marketing-type electronic communications). It shall be noted that electronic communications that include evidence of a communication thread (i.e., the email subject has reply to and/or forward abbreviations) may be indicative of credential harvesting and, thus, less likely to be marketing-type electronic communications. For instance, in a non-limiting example, when the machine learning-based electronic communication classification model detects and/or identifies the "reply to" and/or "forward" abbreviations within an email subject of the subject third-party electronic communication, it may lower the probability of categorizing the subject third-party electronic communication as belonging to the target non-malicious electronic communication type (i.e., marketing-type electronic communications).

2.30 Computing Machine Learning-Based Electronic Communication Inferences

S230, which includes computing machine learning-based electronic communication inferences, may function to compute a machine learning-based electronic communication inference for a target electronic communication based on a corpus of electronic communication features associated with the target electronic communication. In one or more embodiments, S230 may function to compute, via the electronic communication machine learning classification model, a distinct machine learning-based electronic communication classification inference for each distinct inbound electronic communication obtained by S210. It shall be recognized that the phrase "machine learning-based electronic communication inference" may be interchangeably referred to herein as an "electronic communication-type classification inference".

In one or more embodiments, S230 may function to compute, using a machine learning-based electronic communication classification model, an electronic communication-type classification inference that includes a probability of a subject third-party electronic communication being of (or corresponding to) a target non-malicious electronic communication type (i.e., marketing-type electronic communications), as shown generally by way of example in FIG. 11. In such embodiments, the machine learning-based electronic communication classification model may compute the electronic communication-type classification inference based on (or in response to) receiving, as input, a first corpus of feature vectors that may be likely indicative of whether the subject third-party electronic communication is of the target non-malicious electronic communication type and a second corpus of feature vectors that may be likely indicative of whether the subject third-party electronic communication is a suspected malicious electronic communication, as described above.

Configuring the Electronic Communication Machine Learning Classification Model|Training Data Curation In one or more embodiments, the system or service implementing the method 200 may function to configure the electronic communication machine learning classification model based on one or more corpora of training data. That is, in one or more embodiments, the system or service implementing the method 200 may function to curate one or more corpora of training data samples and train the electronic communication machine learning classification model using the one or more corpora of curated training data. It shall be noted that in some embodiments the "electronic communication machine learning classification model" may be interchangeably referred to herein as the "machine learning-based electronic communication classification model".

In one or more embodiments, the one or more corpora of training data samples may be constructed based on sourcing a plurality of historical electronic communications from one or more cybersecurity investigation findings databases. In such embodiments, each of the one or more corpora of training data samples may include a plurality of electronic communication training data samples in which each distinct electronic communication training data sample includes a training sample pairing comprising a distinct electronic communication (e.g., a distinct email) and an unsolicited electronic communication classification label (e.g., marketing classification label).

For instance, in a non-limiting example, one of the one or more training data samples included in one of the one or more corpora of training data samples may include a training sample pairing comprising an electronic communication having a product or service survey and the unsolicited electronic communication classification label (e.g., the marketing classification label).

Additionally, or alternatively, in another non-limiting example, one of the one or more training data samples included in one of the one or more corpora of training data samples may include a training sample pairing comprising a sales outreach electronic communication and the unsolicited electronic communication classification label (e.g., the marketing classification label)

Additionally, or alternatively, in another non-limiting example, one of the one or more training data samples included in one of the one or more corpora of training data samples may include a training sample pairing comprising a sales/sales development representative (SDR) electronic communication and the unsolicited electronic communication classification label (e.g., the marketing classification label).

Additionally, or alternatively, in another non-limiting example, one of the one or more training data samples included in one of the one or more corpora of training data samples may include a training sample pairing comprising a marketing-type electronic communication and the unsolicited electronic communication classification label (e.g., the marketing classification label).

Additionally, or alternatively, in another non-limiting example, a subset of training data samples included in the one or more corpora of training data samples may include a plurality of historical alerts that were closed as malicious by an analyst. In such a non-limiting example, each historical alert of the plurality of historical alerts is assigned a "not marketing" classification label.

Accordingly, in one or more embodiments, the system or service implementing the method 200 may function to train a machine learning-based classification model based on the one or more curated corpora of (e.g., labeled) training data samples. It shall be noted that, in response to or based on the training, the electronic communication machine learning classification model may be configured with learnable parameters mapped to each of the above-mentioned electronic communication features described in S220.

Implementing the Electronic Communication Machine Learning Classification Model

In one or more embodiments, the system or service implementing the method 200 may function to implement the electronic communication machine learning classification model into the subsystem 300 or the like based on the electronic communication machine learning classification model satisfying a minimum electronic communication classification efficacy value or a minimum training efficacy value.

Figure 3:
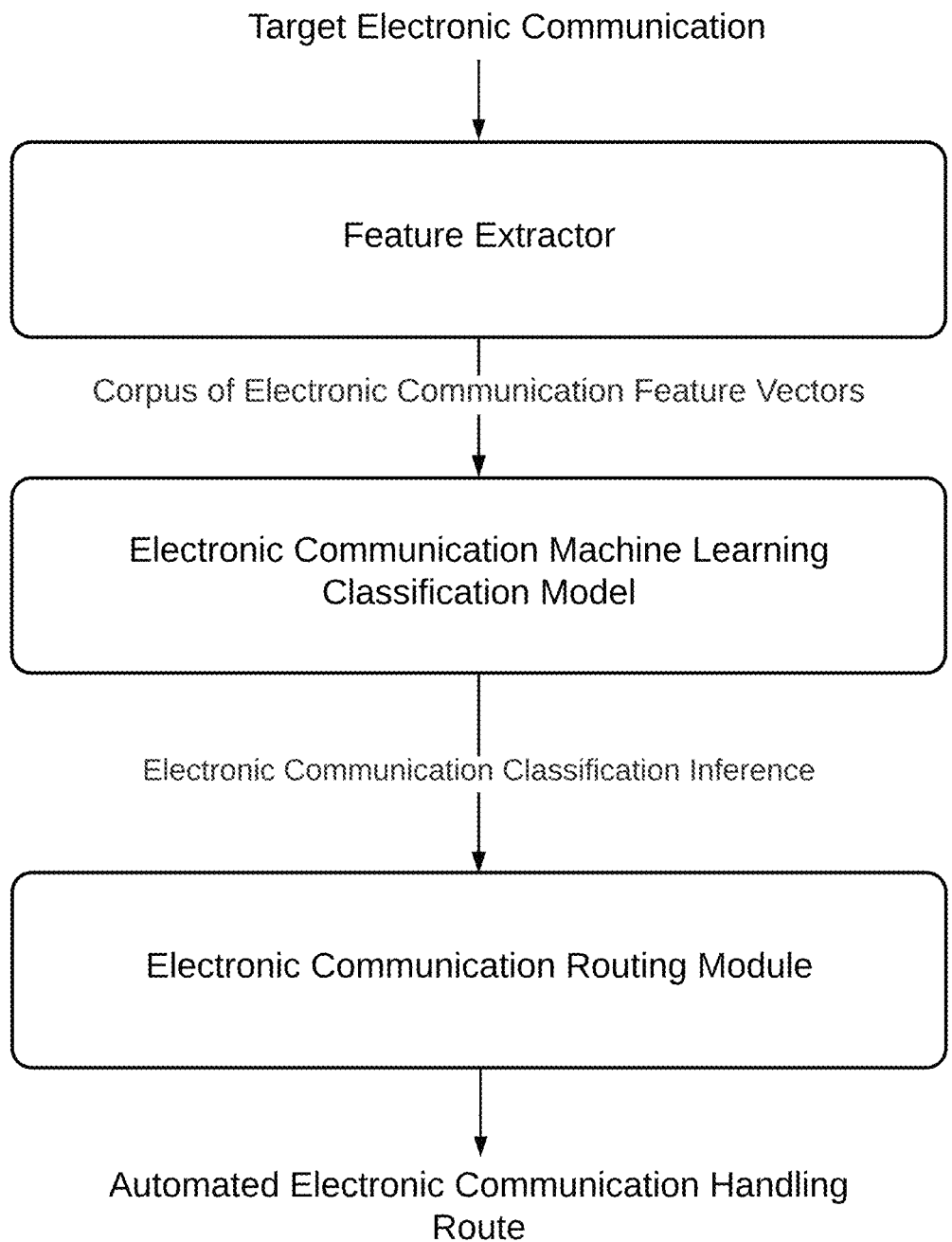
FIG. 3 illustrates a schematic representation of a system or service implementing the method 200 in accordance with one or more embodiments of the present application.

In a first implementation, based on the electronic communication machine learning classification model receiving, as input, one or more corpora of feature vectors associated with a target electronic communication, the electronic communication machine learning classification model may function to compute an unsolicited electronic communication classification inference comprising a probability, a likelihood, and/or a confidence score (e.g., an unsolicited electronic communication score or the like) that the target electronic communication is of the marketing class of electronic communications (e.g., the unsolicited electronic communication class), as shown generally by way of example in FIG. 3.

Additionally, in a variant to the first implementation, based on the electronic communication machine learning classification model sequentially receiving a plurality of corpora of electronic communication feature vectors associated with a plurality of target electronic communications, the electronic communication machine learning classification model may function to sequentially compute a distinct unsolicited electronic communication classification inference that corresponds to a respective one of the plurality of target electronic communications.

For instance, in a non-limiting example, using the machine learning-based electronic communication classification model, S230 may function to compute an electronic communication-type classification inference that includes an electronic communication marketing score (i.e., a marketing score or the like) of ninety-seven (97) for a subject third-party electronic communication. In such a non-limiting example, the electronic communication marketing score of ninety-seven (97) indicates a high likelihood that the subject third-party electronic communication is of the target non-malicious electronic communication type (i.e., marketing-type electronic communications). Thus, in some embodiments, the cybersecurity event detection and response service may function to automatically attribute a classification label of the target non-malicious electronic communication type (i.e., marketing-type electronic communications)

to the subject third-party electronic communication based on the electronic communication marketing score satisfying a minimum electronic communication classification threshold. It shall be noted that, in some embodiments, the minimum electronic communication classification threshold, in some embodiments, may be set at ninety-five.

In another non-limiting example, using the machine learning-based electronic communication classification model, S230 may function to compute an electronic communication-type classification inference that includes an electronic communication marketing score (i.e., a marketing score or the like) of twenty (20) for a subject third-party electronic communication. In such a non-limiting example, the electronic communication marketing score of twenty (20) indicates a low likelihood that the subject third-party electronic communication is of the target non-malicious electronic communication type (i.e., marketing-type electronic communications). Thus, in some embodiments, the cybersecurity event detection and response service may function to forego automatically attributing a classification label of the target non-malicious electronic communication type (i.e., marketing-type electronic communications) to the subject third-party electronic communication based on the electronic communication marketing score failing to satisfy a minimum electronic communication classification threshold.

2.40 Intelligent Electronic Communication Routing

S240, which includes intelligent electronic communication routing, may function to automatically identify an automated electronic communication handling route for a target electronic communication (or a target phishing alert) based on the unsolicited electronic communication classification inference associated with the target electronic communication. In one or more embodiments, a system or service implementing the method 200 may include a plurality of distinct automated electronic communication handling routes for accelerated disposal, mitigation, and/or handling of inbound electronic communications (or phishing alerts).

In one or more embodiments, each of the plurality of distinct automated electronic communication handling routes may be associated with or mapped to a distinct unsolicited electronic communication score range of a plurality of distinct unsolicited electronic communication score ranges. Accordingly, in one or more embodiments, S240 may function to evaluate a computed unsolicited electronic communication score (e.g., a computed marketing electronic communication classification score, an electronic communication marketing score or the like) against the plurality of distinct unsolicited electronic communication score ranges to identify one of the plurality of automated electronic communication handling routes that corresponds to the computed unsolicited electronic communication score. Stated another way, S240 may function to evaluate a computed unsolicited electronic communication score against the plurality of distinct unsolicited electronic communication score ranges and identify an automated electronic communication handling route based on the computed unsolicited electronic communication score having a score value that is within the unsolicited electronic communication score range of the automated electronic communication handling route. It shall be noted that the plurality of unsolicited electronic communication score ranges associated with or mapped to the plurality of automated electronic communication handling routes may be system/service-defined score ranges and/or may be adjusted to satisfy score range criteria defined by a subscriber (e.g., adjusted/tuned on a per-subscriber basis).

In a first implementation, S240 may function to automatically route a target electronic communication to an electronic communication triaging queue when a computed unsolicited electronic communication score associated with the target electronic communication is within a score range of an automated electronic communication triaging route. Accordingly, in one or more embodiments, based on routing the target electronic communication to the electronic communication triaging queue, a system or service implementing the method 200, an analyst or the like may function to triage the target electronic communication.

In a second implementation, S240 may function to automatically route a target electronic communication to an electronic communication class confirmation queue when a computed unsolicited electronic communication score associated with the target electronic communication is within a score range of an automated electronic communication class confirmation route. Accordingly, in one or more embodiments, based on routing the target electronic communication to the electronic communication class confirmation queue, a system or service implementing the method 200, an analyst or the like may function to confirm or disconfirm that the target electronic communication is of the unsolicited electronic communication class (e.g., the marketing class of electronic communications) prior to disposal of the target electronic communication.

In a third implementation, S240 may function to automatically triage a phishing alert that corresponds to a target electronic communication when a computed unsolicited electronic communication score associated with the target electronic communication satisfies an automated alert triaging threshold. Stated another way, in one or more embodiments, a system or service implementing method 200 may function to automatically close a pending phishing alert and attribute a close reason of "benign" to the pending phishing alert when an unsolicited electronic communication score (i.e., marketing score, or the like) associated with a subject electronic communication to which the pending phishing alert corresponds satisfies a predetermined minimum alert triaging threshold.

Figure 4:
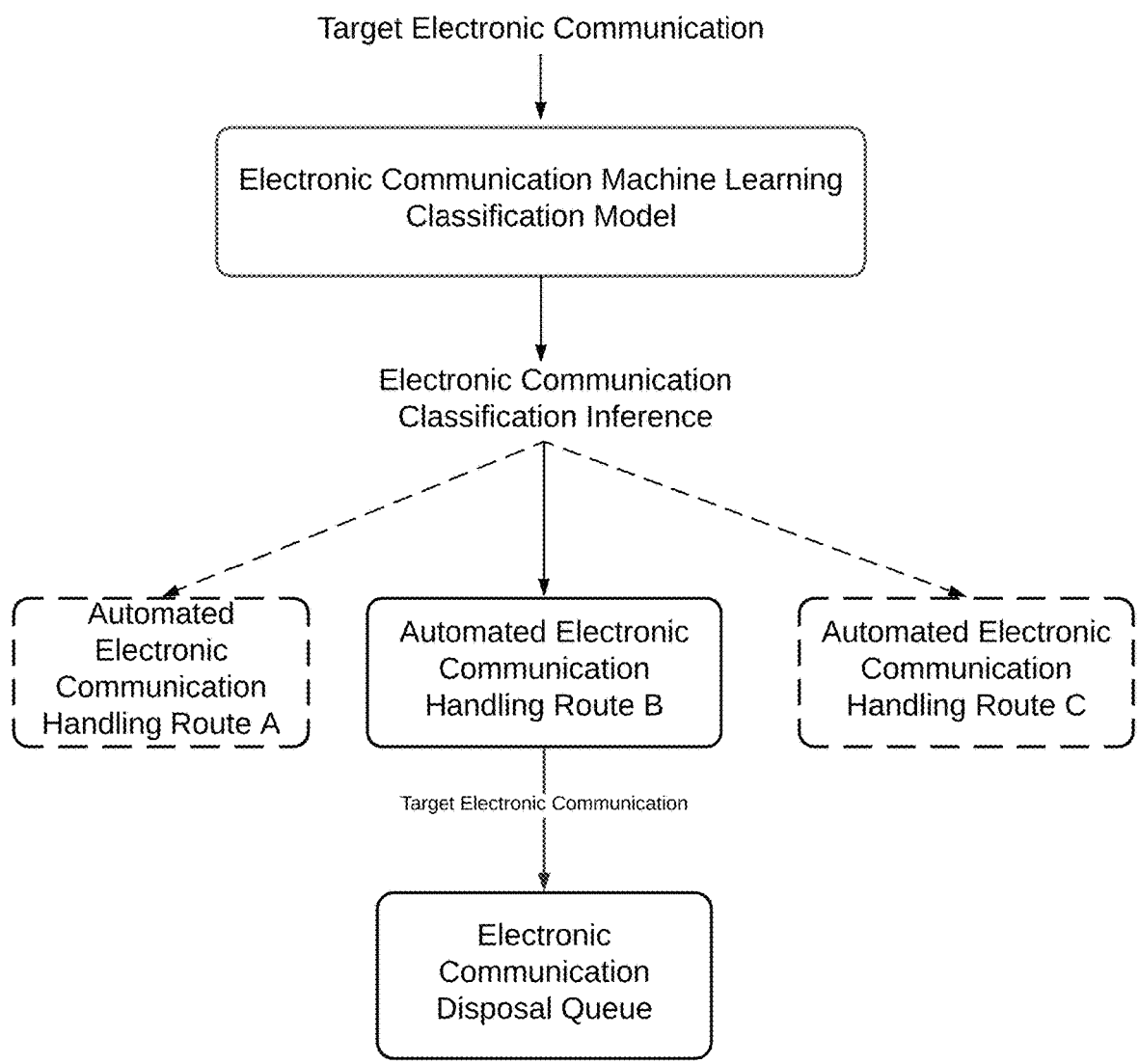
FIG. 4 illustrates a schematic representation for automatically identifying and disposing of electronic communications of a target type in accordance with one or more embodiments of the present application.

In a fourth implementation, S240 may function to automatically route a target electronic communication to an electronic communication disposal queue when a computed unsolicited electronic communication score associated with the target electronic communication is within a score range of an automated electronic communication disposal route. Accordingly, in one or more embodiments, based on routing the target electronic communication to the electronic communication disposal queue, a system or service implementing the method 200 may function to automatically dispose of the target electronic communication thereby bypassing a cybersecurity investigation, a triaging, and/or analyst assessment of the target electronic communication, as shown generally by way of example in FIG. 4.

It shall be noted that, in one or more embodiments, S240 may function to prevent or restrict a routing of a subject electronic communication to the electronic communication disposal queue when the subject electronic communication includes one or more suspicious indicators (e.g., sender domain age is less than six months old, etc.). Accordingly, in such embodiments, S240 may function to instead route the subject electronic communication to the electronic communication triaging queue. That is, using one or more post-processing heuristics, S240 may function to force a triage of electronic communications (or phishing alerts) having one or more suspicious pieces of data that may indicate the subject electronic communication is suspicious and/or malicious.

In one or more embodiments, S240 may function to automatically tag or attribute a classification label of the target non-malicious electronic communication type to a third-party electronic communication based on a probability or score of an electronic communication-type classification inference that corresponds to the third-party electronic communication satisfying a minimum electronic communication classification threshold. In such embodiments, S240 may function to automatically route a security alert associated with (or that corresponds to) the third-party electronic communication to an alert disposal queue based on the third-party electronic communication having the classification label of the target non-malicious electronic communication type. It shall be noted that S240 may function to bypass a cybersecurity investigation into the security alert associated with (or corresponding to) the third-party electronic communication, as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety herein.

It shall be further recognized that, in one or more embodiments, the security alert may be automatically generated by the cybersecurity event detection and response service in response to receiving a request from the subscriber to assess a threat of the third-party electronic communication. Accordingly, in such embodiments, the security alert associated with the third-party electronic communication may be routed to a security alert queue based on the cybersecurity event detection and response service generating the security alert. The security alert queue, in some embodiments, may include a plurality of distinct security alerts in which each security alert of the plurality distinct security alerts may be awaiting an alert triage. Stated another way, the security alerts generated by the cybersecurity event detection and response service may be stored in the security alert queue for review and/or evaluation by a security analyst or the like.

Accordingly, in one or more embodiments, based on or in response to automatically attributing a classification label of the target non-malicious electronic communication-type (i.e., marketing-type electronic communications) to a subject third-party electronic communication, S240 may function to automatically tag a security alert that corresponds to the subject third-party electronic communication as a closed cybersecurity alert or a resolved cybersecurity alert, and automatically remove the security alert that corresponds to the subject third-party electronic communication from the security alert queue by automatically routing the security alert that corresponds to the subject third-party electronic communication to an alert disposal queue.

Figure 9:
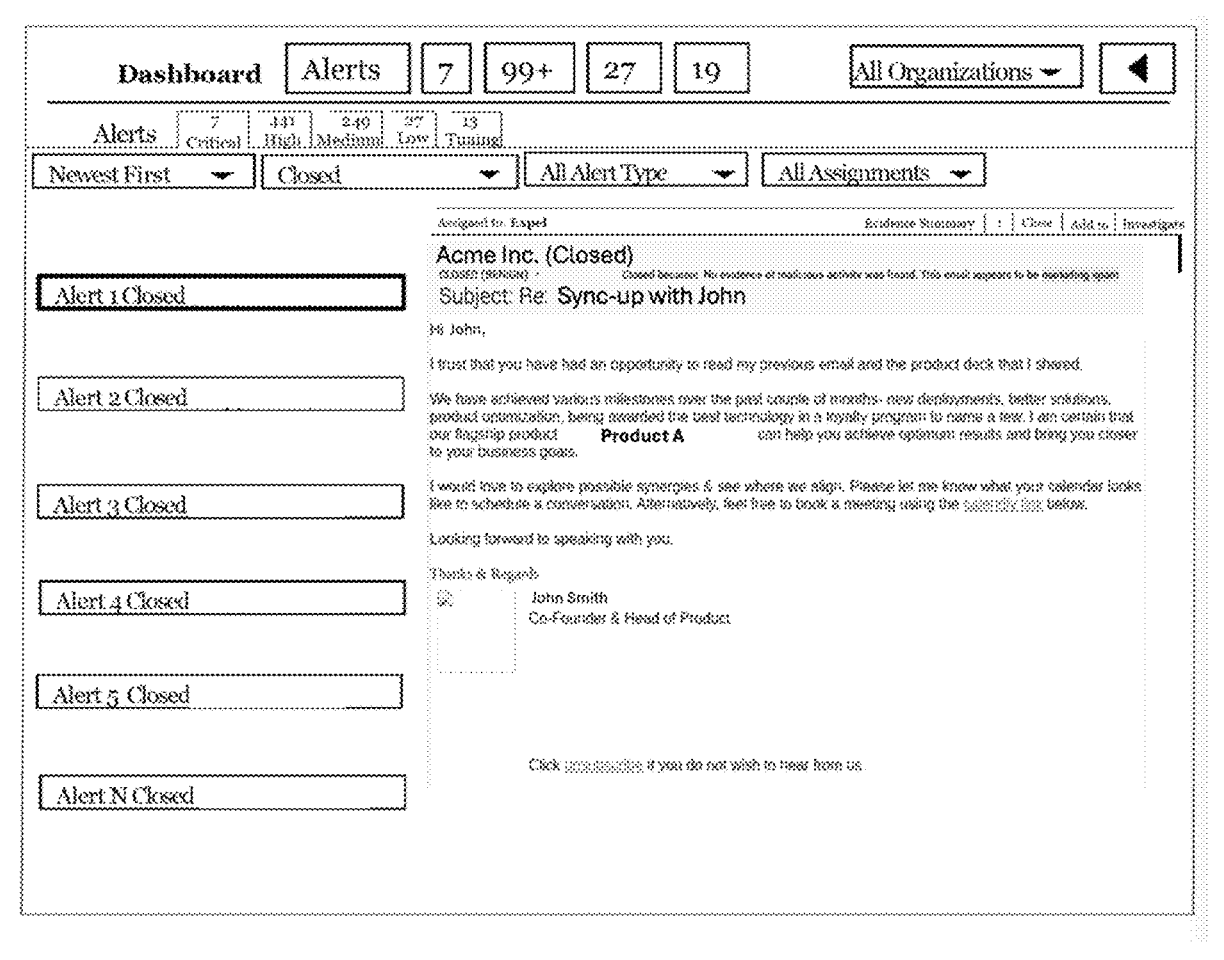

Stated differently, in one or more embodiments, the security alert associated with the subject third-party electronic communication is automatically closed or automatically resolved in response to routing the security alert associated with the subject third-party electronic communication to the alert disposal queue, as shown generally by way of example in FIG. 9.

Additionally, or alternatively, in one or more embodiments, the cybersecurity event detection and response service may function to generate a phishing alert (i.e., a security alert or the like) based on receiving a request from a subscriber to assess a threat of a third-party electronic communication. The phishing alert, in one or more embodiments, may include a representation of the third-party electronic communication. In such embodiments, the cybersecurity event detection and response service may function to extract one or more corpora of feature vectors from the third-party electronic communication based on providing the third-party electronic communication (or the phishing alert) as input to one or more feature extractors, wherein extracting the one or more corpora of feature vectors includes extracting a first corpus of feature vectors likely indicative of whether the third-party electronic communication is of a target non-malicious electronic communication type, and extracting a second corpus of feature vectors likely indicative of whether the third-party electronic communication is a suspected malicious electronic communication.

Additionally, in such embodiments, the cybersecurity event detection and response service may function to compute, using the machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors.

In one or more embodiments, the cybersecurity event detection and response service may function to automatically tag or automatically attribute a classification label of the target non-malicious electronic communication type to the third-party electronic communication (or the phishing alert) when the probability of the electronic communication-type classification inference satisfies a minimum electronic communication classification threshold. Accordingly, the cybersecurity event detection and response service may function to automatically route the phishing alert associated with the third-party electronic communication to an alert disposal queue based on the third-party electronic communication (or the phishing alert) having the classification label of the target non-malicious electronic communication type (i.e., marketing-type electronic communication).

Figure 10:
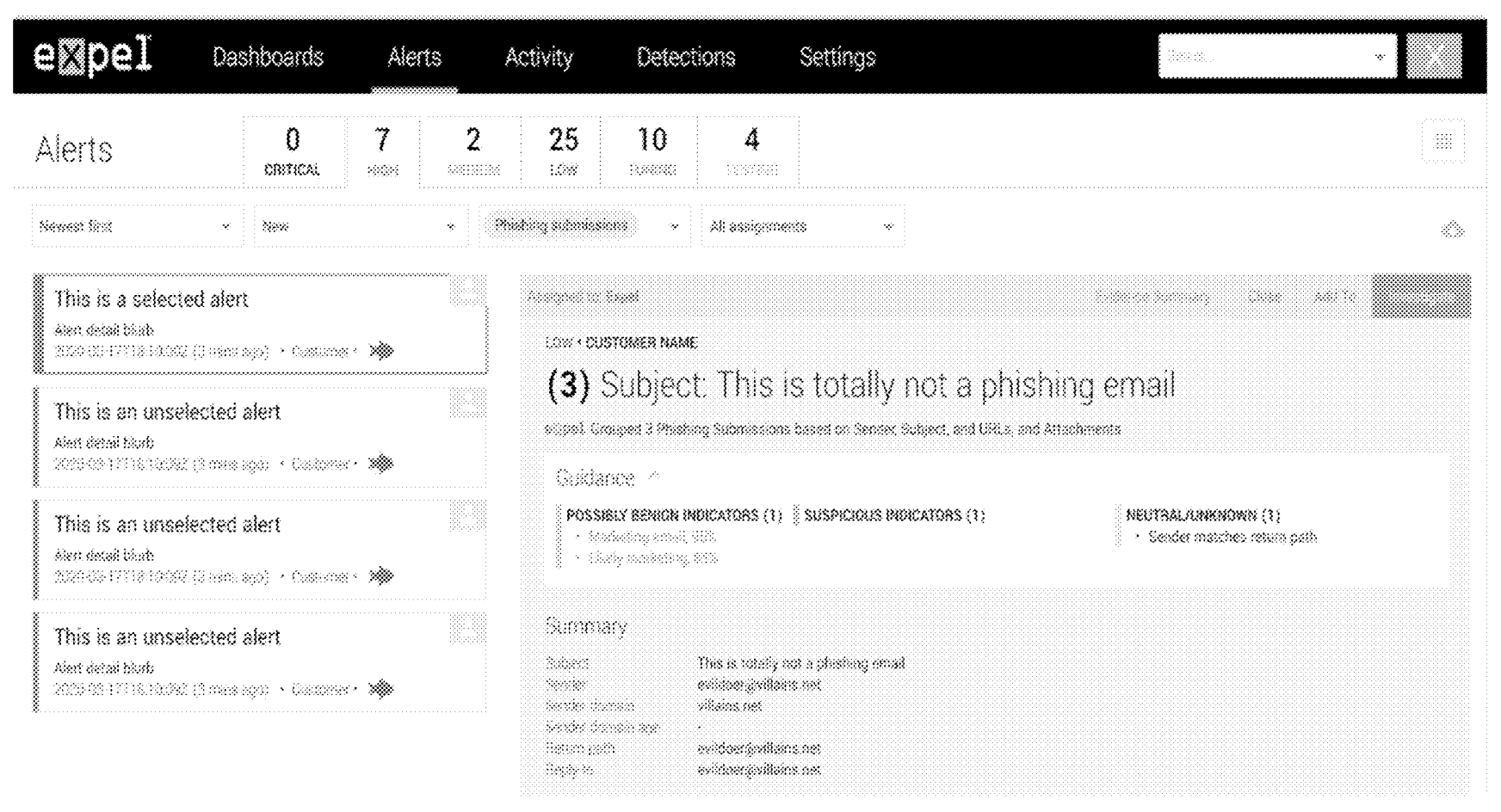
Figure 12:
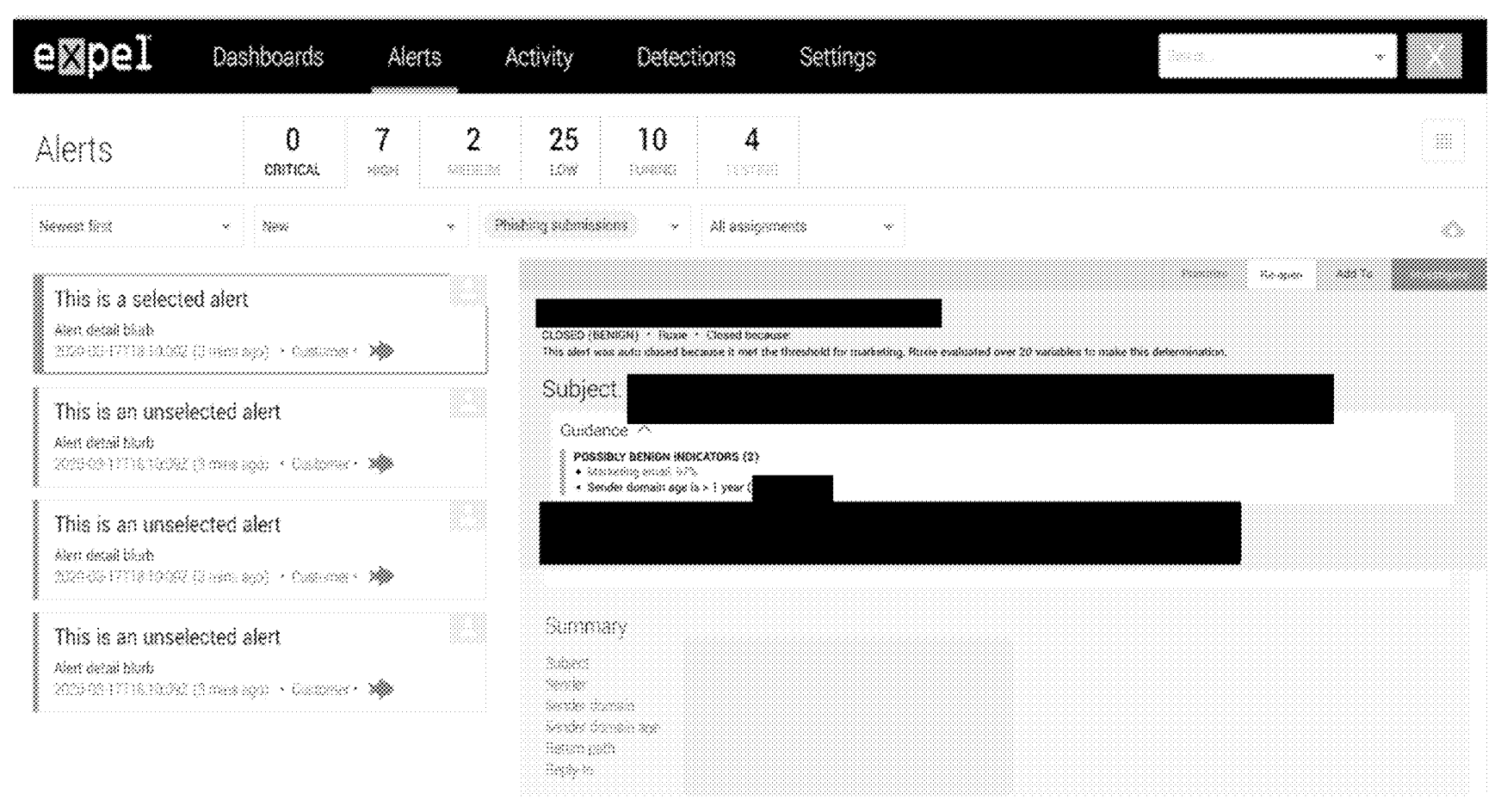

Alternatively, in one or more embodiments, the cybersecurity event detection and response service may function to route the phishing alert to the above-described security alert queue when the probability of the electronic communication-type classification inference is below the minimum electronic communication classification threshold, as shown generally by way of example in FIG. 8, FIG. 10, and FIG. 12. In such embodiments, the cybersecurity event detection and response service may function to display, via a web-accessible user interface, a representation of the phishing alert that includes the representation of the third-party electronic communication, and a phishing guidance user interface element integrally displayed within the representation of the phishing alert, as shown generally by way of example in FIG. 10. The phishing guidance user interface element, in some embodiments, may include the probability of the third-party electronic communication being of the target non-malicious electronic communication type (i.e., marketing-type electronic communications). Additionally, in some embodiments the phishing guidance user interface element may further include a first distinct section that may indicate a numerical quantity of a total number of non-malicious indicators identified within the third-party electronic communication and an enumeration of the non-malicious indicators that corresponds to the numerical quantity of the total number of non-malicious indicators identified within the third-party electronic communication, and/or a second distinct section that may indicate a numerical quantity of a total number of malicious indicators identified within the third-party electronic communication and an enumeration of the malicious indicators that corresponds to the numerical quantity of the total number of malicious indicators identified within the third-party electronic communication.

It shall be noted that, in one or more embodiments, the phishing alert may be routed to an alert disposal queue based on evaluation of the phishing guidance user interface element when the phishing guidance user interface element does not indicate or include any suspicious indicators.

It shall be noted that, in one or more embodiments, the phishing alert may be routed to an alert escalation queue based on evaluation of the phishing guidance user interface element when the phishing guidance user interface element includes one or more suspicious indicators.

2.50 Monitoring and Training the Electronic Communication Machine Learning Classification Model S250, which includes monitoring and training the electronic communication machine learning classification model (i.e., the machine learning-based electronic communication classification model), may function to monitor electronic communication classification inferences computed by the electronic communication machine learning classification model and periodically train or re-train the electronic communication machine learning classification model.

In one or more embodiments, S250 may function to randomly route, to the electronic communication triaging queue, a subset of electronic communications computed to be of the unsolicited electronic communication class by the electronic communication machine learning model (e.g., the marketing class of electronic communications, marketing-type electronic communications, or the like) to confirm the electronic communication machine learning classification model accurately classified each electronic communication of the subset. Stated another way, a random subset of electronic communications of a plurality of electronic communications tagged for automated disposal may be redirected to an analyst review queue for confirmation that each electronic communication of the subset is of the unsolicited electronic communication class (e.g., marketing-type electronic communications). In this way, a system or service implementing the method 200 may ensure that the electronic communication machine learning classification model is appropriately classifying inbound electronic communications to the unsolicited electronic communication class (e.g., emails that include one or more pieces of content that are promoting or advertising a target service, a target product, or a target event), thereby reducing a risk of automatically closing or disposing of a malicious or threat-comprising electronic communication.

It shall be noted that, in one or more embodiments, S250 may function to periodically train or re-train the electronic communication machine learning classification model to modify, extend, and/or fine-tune a predictive capability of the electronic communication machine learning classification model.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for accelerating a disposition of non-malicious electronic communications, the computer-implemented method comprising:

receiving, from a subscriber, a request to assess a threat of a third-party electronic communication;

extracting one or more corpora of feature vectors from the third-party electronic communication based on providing the third-party electronic communication as input to a feature extractor, wherein extracting the one or more corpora of feature vectors includes:

(i) extracting a first corpus of feature vectors likely indicative of whether the third-party electronic communication is of a target non-malicious electronic communication type, wherein:
the target non-malicious electronic communication type refers to a class of electronic communications that promotes one or more products, one or more services, or one or more events, and
one feature of the first corpus of feature vectors indicates whether the third-party electronic communication includes an unsubscribe feature, and
(ii) extracting a second corpus of feature vectors likely indicative of whether the third-party electronic communication is a suspected malicious electronic communication;
computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors, wherein the machine learning-based electronic communication classification model uses at least the one feature of the first corpus of feature vectors to assist with computing the probability of the third-party electronic communication being of the target non-malicious electronic communication type;
automatically attributing a classification label of the target non-malicious electronic communication type to the third-party electronic communication based on the probability of the electronic communication-type classification inference satisfying a minimum electronic communication classification threshold; and
automatically routing a security alert associated with the third-party electronic communication to an alert disposal queue based on the third-party electronic communication having the classification label of the target non-malicious electronic communication type.

2. The computer-implemented method according to claim 1, further comprising:
in response to automatically routing the security alert associated with the third-party electronic communication to the alert disposal queue:
bypassing a cybersecurity investigation into the security alert associated with the third-party electronic communication, wherein the cybersecurity investigation includes executing one or more cybersecurity investigation workflows.

3. The computer-implemented method according to claim 1, wherein:
the security alert associated with the third-party electronic communication is automatically generated by a cybersecurity event detection and response service in response to receiving the request from the subscriber,
the security alert associated with the third-party electronic communication is routed to a security alert queue based on the cybersecurity event detection and response generating the security alert, and
the security alert queue includes a plurality of security alerts, wherein each security alert of the plurality of security alerts is awaiting an alert triage.

4. The computer-implemented method according to claim 3, further comprising:
in response to automatically attributing the classification label of the target non-malicious electronic communication type to the third-party electronic communication:
automatically tagging the security alert associated with the third-party electronic communication as a closed cybersecurity alert or a resolved cybersecurity alert; and
automatically removing the security alert associated with the third-party electronic communication from the security alert queue based on the automatic tagging, wherein automatically removing the security alert associated with the third-party electronic communication from the security alert queue includes automatically routing the security alert associated with the third-party electronic communication to the alert disposal queue.

5. The computer-implemented method according to claim 1, wherein:
the security alert associated with the third-party electronic communication is automatically closed or automatically resolved in response to routing the security alert associated with the third-party electronic communication to the alert disposal queue.

6. The computer-implemented method according to claim 1, further comprising:
obtaining a corpus of training data that includes a plurality of electronic communication training data samples, wherein the corpus of training data includes:
(a) a first set of labeled electronic communications, wherein each electronic communication of the first set of labeled electronic communications is labeled as being of the target non-malicious electronic communication type,
(b) a second set of labeled electronic communications, wherein each electronic communication of the second set of labeled electronic communications is labeled as not being of the target non-malicious electronic communication type, and
(c) a third set of unlabeled electronic communications, wherein the corpus of training data includes more unlabeled electronic communications than labeled electronic communications; and
configuring the machine learning-based electronic communication classification model based on a semi-supervised training of a machine learning classification model using the corpus of training data.

7. A computer-implemented method for accelerating a disposition of non-malicious electronic communications, the computer-implemented method comprising:
generating a phishing alert based on receiving a request from a subscriber to assess a threat of a third-party electronic communication, wherein the phishing alert includes a representation of the third-party electronic communication;
extracting one or more corpora of feature vectors from the third-party electronic communication based on providing the third-party electronic communication as input to one or more feature extractors, wherein extracting the one or more corpora of feature vectors includes:
(i) extracting a first corpus of feature vectors likely indicative of whether the third-party electronic communication is of a target non-malicious electronic communication type, wherein:
the target non-malicious electronic communication type refers to a class of electronic communications that promotes one or more products, one or more services, or one or more events, and one feature of the first corpus of feature vectors indicates whether the third-party electronic communication includes an unsubscribe feature, and (ii) extracting a second corpus of feature vectors likely indicative of whether the third-party electronic communication is a suspected malicious electronic communication;

computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors, wherein the machine learning-based electronic communication classification model uses at least the one feature of the first corpus of feature vectors to assist with computing the probability of the third-party electronic communication being of the target non-malicious electronic communication type; and automatically routing the phishing alert to a security alert queue based on the probability of the electronic communication-type classification inference being below a predetermined minimum electronic communication classification threshold.

8. The computer-implemented method according to claim 7, further comprising:

displaying, via a web-accessible user interface, a representation of the phishing alert that includes:
  (a) the representation of the third-party electronic communication, and
  (b) a phishing guidance user interface element integrally displayed within the representation of the phishing alert, wherein the phishing guidance user interface element includes the probability of the third-party electronic communication being of the target non-malicious electronic communication type.

9. The computer-implemented method according to claim 8, wherein:

the phishing guidance user interface element further includes:
  a first distinct section that indicates (b-i) a numerical quantity of a total number of non-malicious indicators identified within the third-party electronic communication and (b-ii) an enumeration of the non-malicious indicators that corresponds to the numerical quantity of the total number of non-malicious indicators identified within the third-party electronic communication, and
  a second distinct section that indicates (b-iii) a numerical quantity of a total number of malicious indicators identified within the third-party electronic communication and (b-iv) an enumeration of the malicious indicators that corresponds to the numerical quantity of the total number of malicious indicators identified within the third-party electronic communication.

10. The computer-implemented method according to claim 9, further comprising:

routing the phishing alert to one of an alert disposal queue or an alert escalation queue based on evaluation of the phishing guidance user interface element.

11. A computer-implemented method for accelerating a disposition of non-malicious electronic communications, the computer-implemented method comprising:

at a cybersecurity event detection and response service:

receiving, from a subscriber, a request to assess a threat of a third-party electronic communication;

extracting one or more corpora of feature vectors from the third-party electronic communication based on providing the third-party electronic communication as input to one or more feature extractors, wherein extracting the one or more corpora of feature vectors includes:
  (i) extracting a first corpus of feature vectors likely indicative of whether the third-party electronic communication is of a target non-malicious electronic communication type, wherein:
    the target non-malicious electronic communication type refers to a class of electronic communications that promotes one or more products, one or more services, or one or more events, and
    one feature of the first corpus of feature vectors indicates whether the third-party electronic communication includes an unsubscribe feature, and
  (ii) extracting a second corpus of feature vectors likely indicative of whether the third-party electronic communication is a suspected malicious electronic communication;

computing, by a machine learning-based electronic communication classification model, an electronic communication-type classification inference that includes a probability of the third-party electronic communication being of the target non-malicious electronic communication type in response to the machine learning-based electronic communication classification model receiving the first corpus of feature vectors and the second corpus of feature vectors, wherein the machine learning-based electronic communication classification model uses at least the one feature of the first corpus of feature vectors to assist with computing the probability of the third-party electronic communication being of the target non-malicious electronic communication type;

automatically attributing a classification label of the target non-malicious electronic communication type to the third-party electronic communication based on the probability of the electronic communication-type classification inference satisfying a minimum electronic communication classification threshold; and automatically routing a security alert that corresponds to the third-party electronic communication to an alert disposal queue based on the third-party electronic communication having the classification label of the target non-malicious electronic communication type.

12. The computer-implemented method according to claim 11, wherein:

one feature of the second corpus of feature vectors indicates whether a return path of the third-party electronic communication matches a sender address of the third-party electronic communication, and the machine learning-based electronic communication classification model uses at least the one feature of the second corpus of feature vectors and a corresponding feature weight to assist with computing the probability of the third-party electronic communication being of the target non-malicious electronic communication type.

13. The computer-implemented method according to claim 11, wherein:
   one feature of the second corpus of feature vectors indicates whether a sender domain of the third-party electronic communication was involved in a previous security incident, and
   the machine learning-based electronic communication classification model uses at least the one feature of the second corpus of feature vectors and a corresponding feature weight to assist with computing the probability of the third-party electronic communication being of the target non-malicious electronic communication type.

14. The computer-implemented method according to claim 11, wherein:
   a second feature of the first corpus of feature vectors indicates whether a sender of the third-party electronic communication corresponds to a corporate marketing account of an organization, and
   the machine learning-based electronic communication classification model further uses the second feature of the first corpus of feature vectors to assist with computing the probability of the third-party electronic communication being of the target non-malicious electronic communication type.

15. The computer-implemented method according to claim 11, wherein:
   a second feature of the first corpus of feature vectors indicates a combined number of terms and phrases included in a body of the third-party electronic communication that is likely indicative of the target non-malicious electronic communication type, and
   the machine learning-based electronic communication classification model further uses the second feature of the first corpus of feature vectors to assist with computing the probability of the third-party electronic communication being of the target non-malicious electronic communication type.

16. The computer-implemented method according to claim 11, wherein:
   a second feature of the first corpus of feature vectors indicates a chromatic intensity of the third-party electronic communication, and
   the machine learning-based electronic communication classification model further uses the second feature of the first corpus of feature vectors to assist with computing the probability of the third-party electronic communication being of the target non-malicious electronic communication type.

17. The computer-implemented method according to claim 11, wherein:
   one feature of the second corpus of feature vectors indicates a domain age of a sender domain used in the third-party electronic communication, and
   the machine learning-based electronic communication classification model uses at least the one feature of the second corpus of feature vectors and a corresponding feature weight to assist with computing the probability of the third-party electronic communication being of the target non-malicious electronic communication type.

18. The computer-implemented method according to claim 11, wherein:
   a second feature of the first corpus of feature vectors indicates a number of digital images embedded in the third-party electronic communication, and
   the machine learning-based electronic communication classification model further uses the second feature of the first corpus of feature vectors to assist with computing the probability of the third-party electronic communication being of the target non-malicious electronic communication type.

\* \* \* \* \*